United States Patent
Kim et al.

(10) Patent No.: US 12,245,310 B2
(45) Date of Patent: Mar. 4, 2025

(54) METHOD AND APPARATUS FOR FAST SMALL DATA TRANSMISSION IN A WIRELESS COMMUNICATION SYSTEM

(71) Applicant: LG ELECTRONICS INC., Seoul (KR)

(72) Inventors: Seokjung Kim, Seoul (KR); Jian Xu, Seoul (KR); Daewook Byun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 406 days.

(21) Appl. No.: 17/759,186

(22) PCT Filed: Jan. 20, 2021

(86) PCT No.: PCT/KR2021/000792
§ 371 (c)(1),
(2) Date: Jul. 20, 2022

(87) PCT Pub. No.: WO2021/150015
PCT Pub. Date: Jul. 29, 2021

(65) Prior Publication Data
US 2023/0083985 A1    Mar. 16, 2023

(30) Foreign Application Priority Data

Jan. 22, 2020   (KR) .................. 10-2020-0008844
Oct. 5, 2020    (KR) .................. 10-2020-0128178

(51) Int. Cl.
H04W 36/28    (2009.01)
H04W 76/12    (2018.01)
(Continued)

(52) U.S. Cl.
CPC .......... *H04W 76/20* (2018.02); *H04W 76/12* (2018.02); *H04W 76/19* (2018.02); *H04W 76/30* (2018.02)

(58) Field of Classification Search
None
See application file for complete search history.

(56) References Cited

U.S. PATENT DOCUMENTS 10,555,366 B2    2/2020  Park et al.
2018/0343698 A1*  11/2018  Mitsui .................. H04W 76/20
(Continued)

FOREIGN PATENT DOCUMENTS

GB    2560756       9/2018
KR    1020190006021  1/2019
(Continued)

OTHER PUBLICATIONS

PCT International Application No. PCT/KR2021/000792, International Search Report dated Apr. 19, 2021, 2 pages.
(Continued)

*Primary Examiner* — Duc T Duong
(74) *Attorney, Agent, or Firm* — LEE, HONG, DEGERMAN, KANG & WAIMEY

(57) ABSTRACT

A method and apparatus for fast small data transmission in a wireless communication system is provided. A last serving RAN node receives, from the wireless device and via a new RAN node, an AS-RAI related to early data transmission. A last serving RAN node decides whether a UE context relocation to the new RAN node for the wireless device is required or not based on the received AS-RAI. A last serving RAN node transmits, to the new RAN node, an RRC message based on the decision.

20 Claims, 20 Drawing Sheets

(51) Int. Cl.
  *H04W 76/15* (2018.01)
  *H04W 76/19* (2018.01)
  *H04W 76/20* (2018.01)
  *H04W 76/30* (2018.01)

(56) References Cited

U.S. PATENT DOCUMENTS

| | | | |
|---|---|---|---|
| 2020/0037210 A1 | 1/2020 | Rugeland et al. | |
| 2021/0037415 A1* | 2/2021 | Liu | H04W 28/06 |
| 2021/0315050 A1* | 10/2021 | R?nneke | H04W 76/27 |
| 2022/0053448 A1* | 2/2022 | Velev | H04W 8/183 |
| 2022/0167433 A1* | 5/2022 | Tirronen | H04W 74/0841 |
| 2022/0174775 A1* | 6/2022 | Rönneke | H04W 76/27 |
| 2023/0108725 A1* | 4/2023 | Shi | H04W 36/0064 370/331 |
| 2024/0098795 A1* | 3/2024 | Yavuz | H04W 74/0833 |

FOREIGN PATENT DOCUMENTS

| | | |
|---|---|---|
| WO | 2019164439 | 8/2019 |
| WO | 2019201563 | 10/2019 |

OTHER PUBLICATIONS

Qualcomm Incorporated, "Introduce MO EDT for User Plane CIoT 5GS Optimisation," 3GPP TSG-SA WG2 Meeting #135, S2-1909908, Oct. 2019, 34 pages.

Qualcomm Incorporated et al., "MO UP Early data Transmission," 3GPP TSG-SA WG2 Meeting #134, S2-1908427, Jun. 2019, 30 pages.

3rd Generation Partnership Project (3GPP), "Technical Specification Group Services and System Aspects; System architecture for the 5G System (5GS); Stage 2 (Release 16)," 3GPP TS 23.501 V16.3.0, Section 5.4.6, Dec. 2019, 407 pages.

* cited by examiner

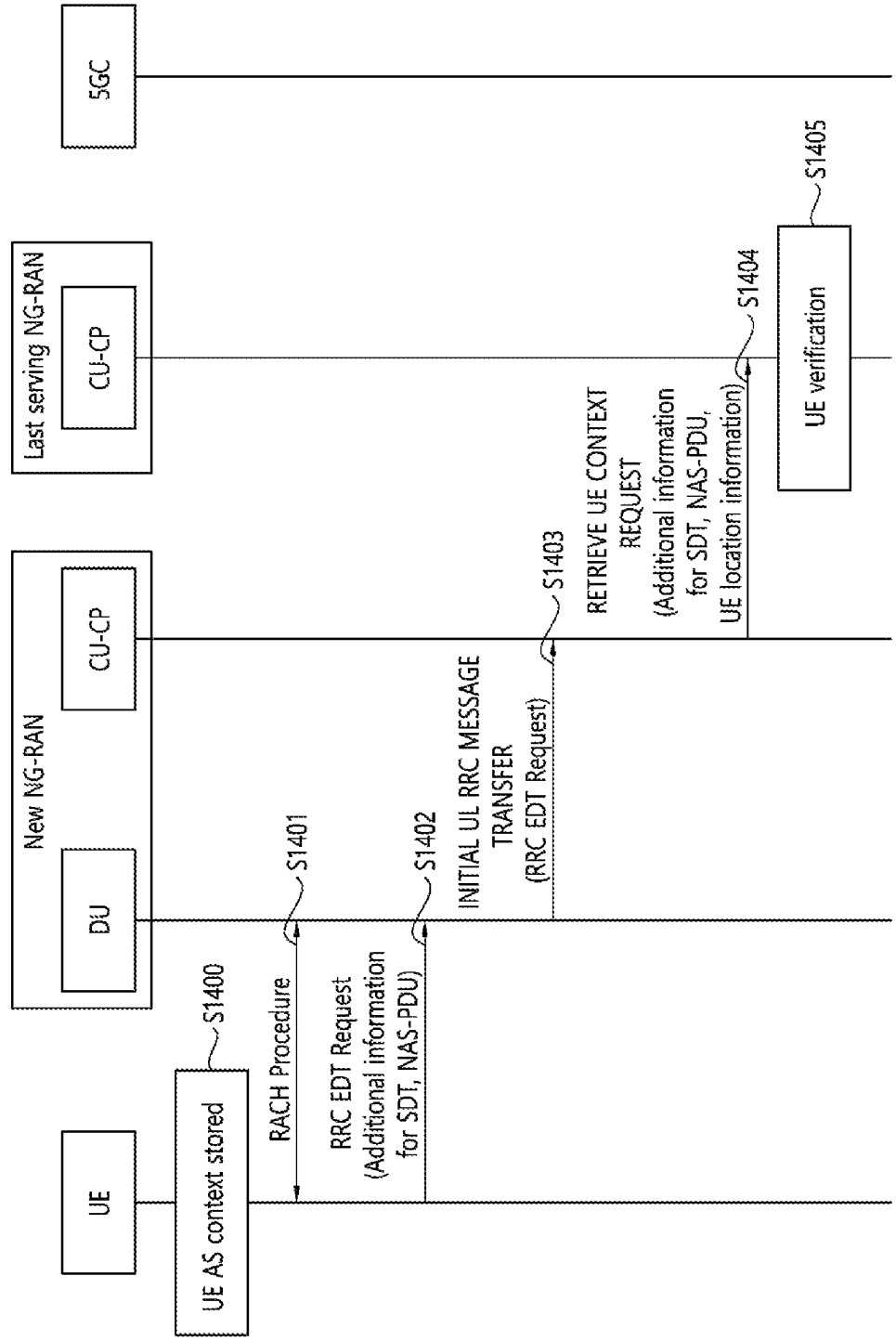

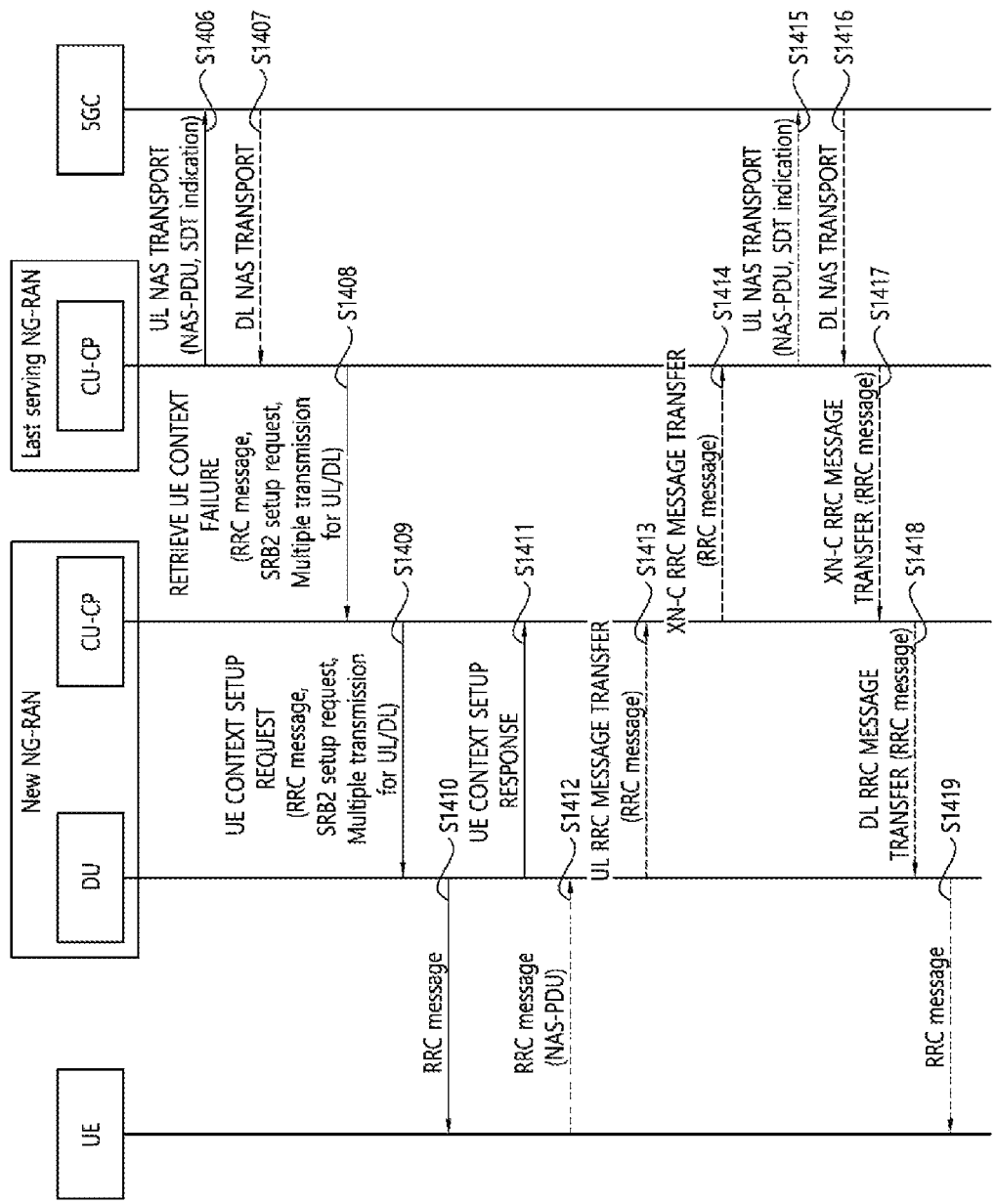

METHOD AND APPARATUS FOR FAST SMALL DATA TRANSMISSION IN A WIRELESS COMMUNICATION SYSTEM

CROSS-REFERENCE TO RELATED APPLICATION(S)

This application is the National Stage filing under 35 U.S.C. 371 of International Application No. PCT/KR2021/000792, filed on Jan. 20, 2021, which claims the benefit of earlier filing date and right of priority to Korean Application Nos. 10-2020-0008844, filed on Jan. 22, 2020, and 10-2020-0128178, filed on Oct. 5, 2020, the contents of which are all incorporated by reference herein in its entirety.

BACKGROUND

Technical Field

The present disclosure relates to a method and apparatus for fast small data transmission in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

Technical Objects

In NR, small data transmission in inactive state could be supported. For example, context fetch and data forwarding (with and without anchor relocation) in inactive state could be supported.

However, the mechanisms to deliver the NAS PDU between the new NG-Radio Access Network (RAN) and the last serving NG-RAN are not defined.

Therefore, studies for fast small data transmission in a wireless communication system are needed.

Technical Solutions

In an aspect, a method performed by a last serving Radio Access Network (RAN) node in a wireless communication system is provided. A last serving RAN node suspends a Radio Resource Control (RRC) connection with a wireless device. A last serving RAN node receives, from the wireless device and via a new RAN node, an Access Stratum (AS)-Release Assistance Information (RAI) related to early data transmission. For example, the AS-RAI informs whether there is Uplink (UL) data transmission and/or Downlink (DL) data transmission for the wireless device subsequent to the early data transmission, or not. A last serving RAN node decides whether a UE context relocation to the new RAN node for the wireless device is required or not based on the received AS-RAI. A last serving RAN node transmits, to the new RAN node, an RRC message based on the decision.

In another aspect, an apparatus for implementing the above method is provided.

Technical Effects

The present disclosure may have various advantageous effects.

According to some embodiments of the present disclosure, a Radio Access Network (RAN) node could efficiently perform fast small data transmission in a wireless communication system.

According to some embodiments of the present disclosure, the last serving NG-RAN could efficiently decide whether the UE context should be relocated or not for small data transmission in RRC-INACTIVE state.

For example, the AMF could know the exact UE location. For example, based on the End Indication and/or an information from the AMF, the last serving NG-RAN could push the UE back into the RRC-INACTIVE state as soon as possible.

For example, the UE could save resource and power by performing the small data transmission.

For example, in Central Unit (CU)-Distributed Unit (DU) split, based on the indication from the last serving NG-RAN, the DU of new NG-RAN can be aware of whether the multiple Uplink (UL) and/or Downlink (DL) transmission is allowed and how the configuration for multiple UL and/or DL transmission is allocated.

According to some embodiments of the present disclosure, a last serving NG-RAN can configure the UE with the RAN-based Notification Area (RNA), where the RNA contains a single or multiple cells, or list of RAN areas supporting the SDT.

According to some embodiments of the present disclosure, a wireless communication system could provide an efficient solution for fast small data transmission in a wireless communication system.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIGS. 14A and 14B show an example of a procedure for CP small data transmission performed by a new NG-RAN and a last serving NG-RAN considering CU-DU split.

DETAILED DESCRIPTION

Figure 1:
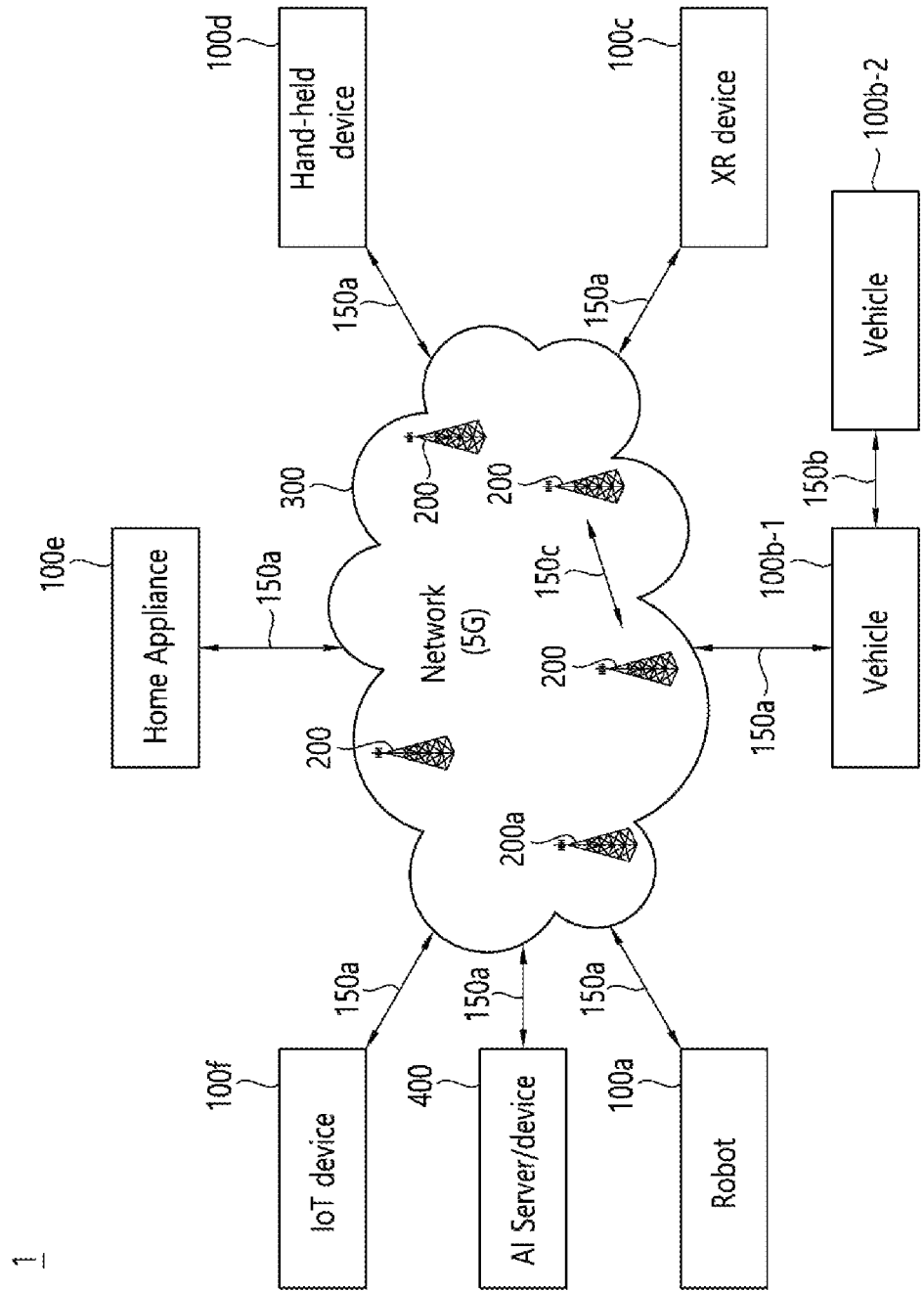
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
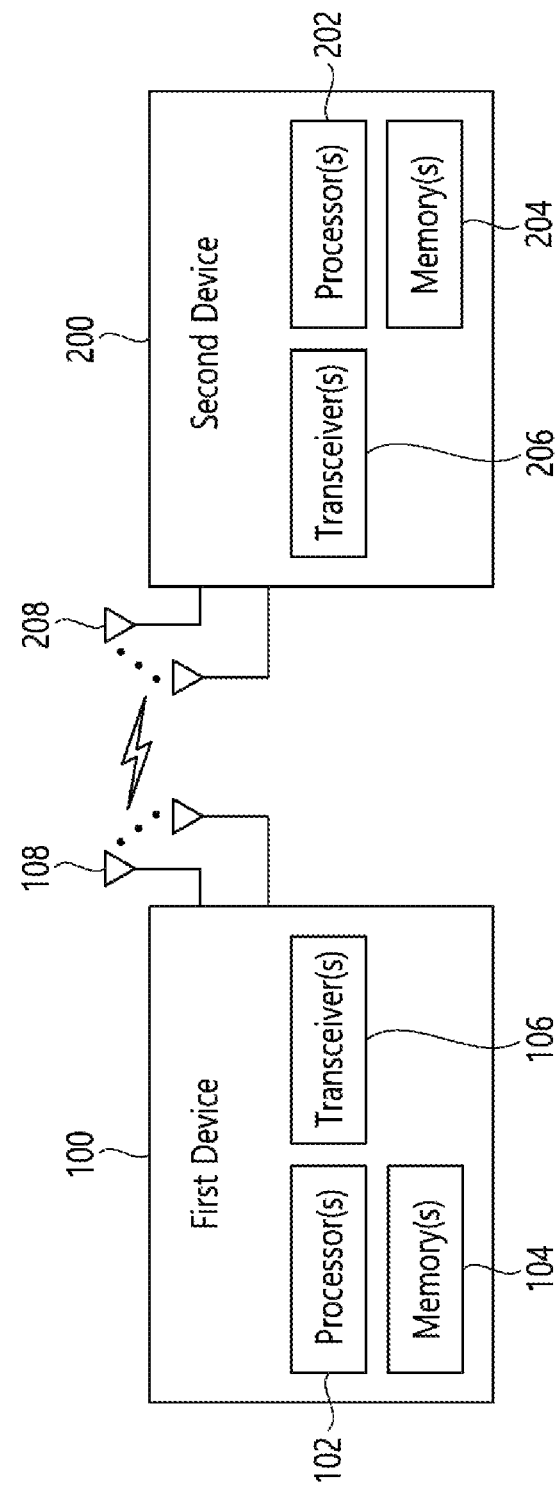
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
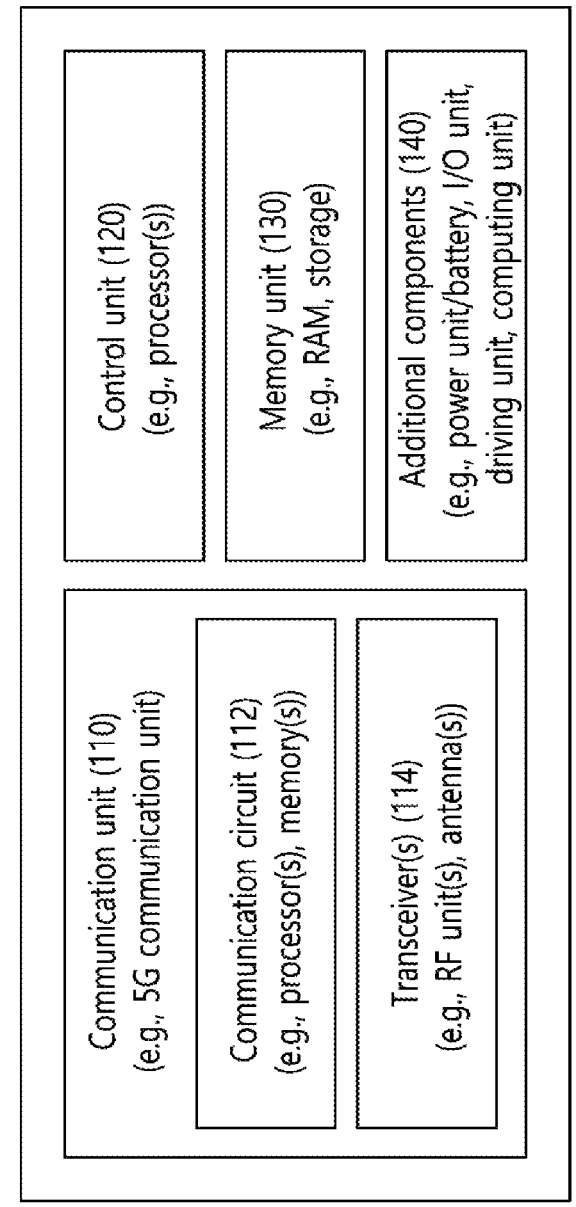
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors.

As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
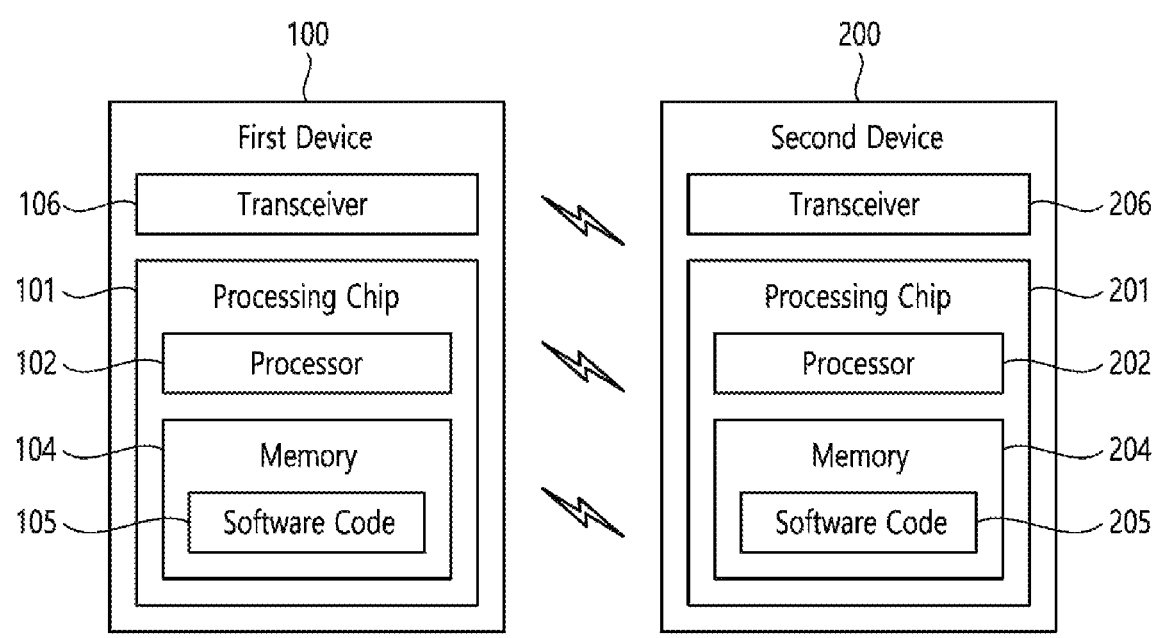
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
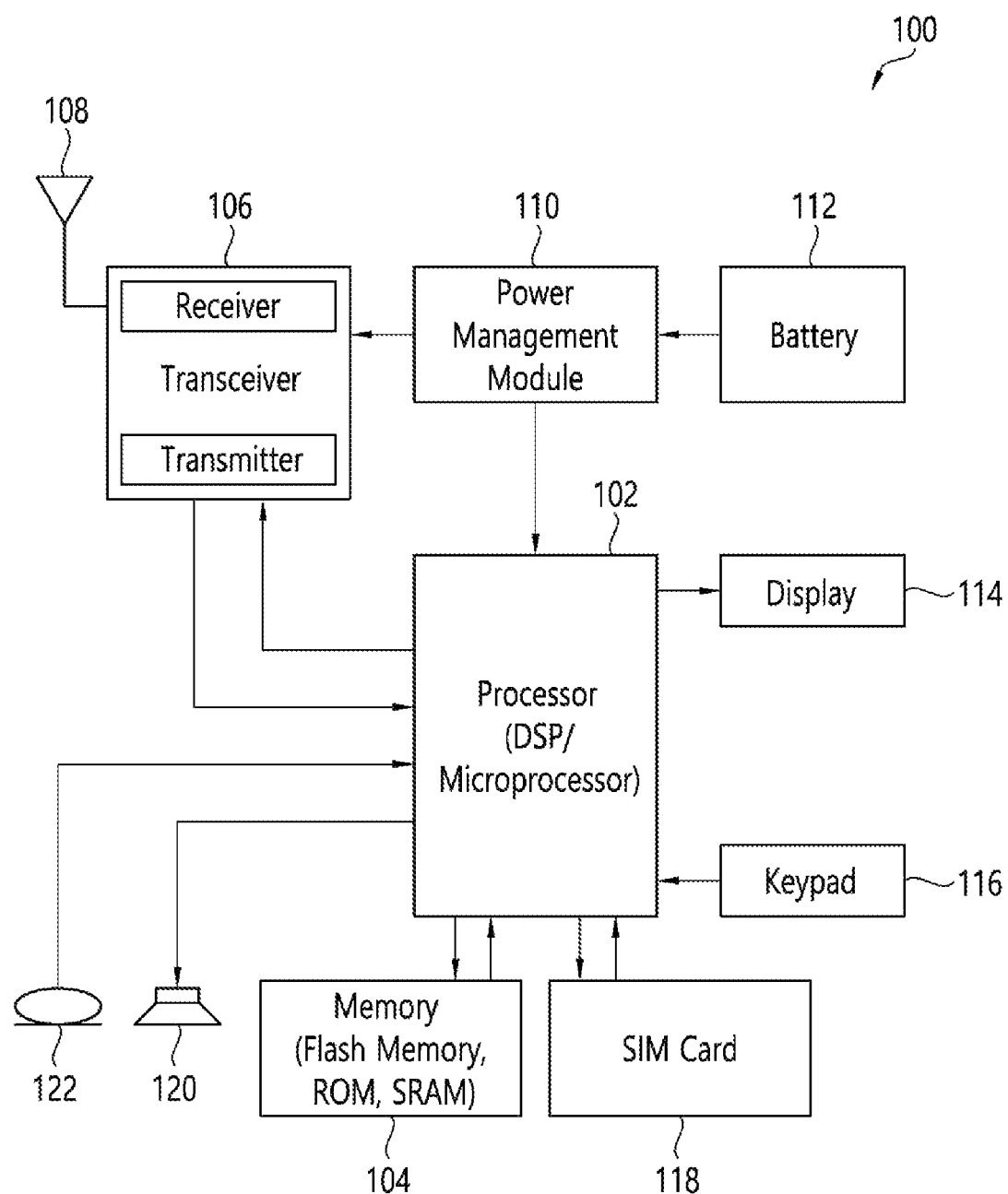
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
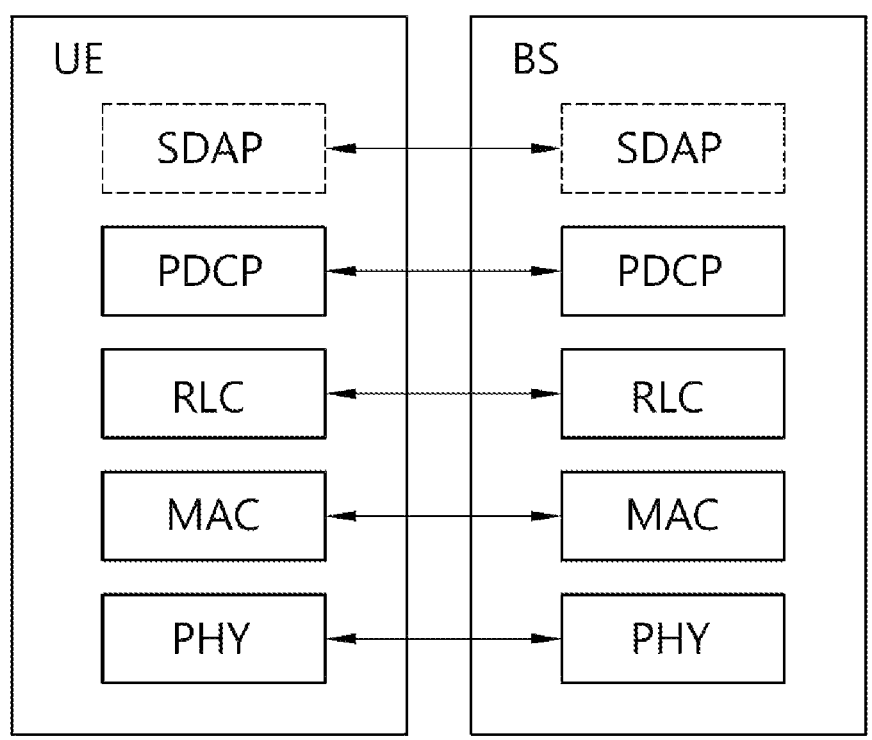
FIGS. 6 and 7 show an example of protocol stacks in a 3GPP based wireless communication system to which implementations of the present disclosure is applied.
Figure 7:
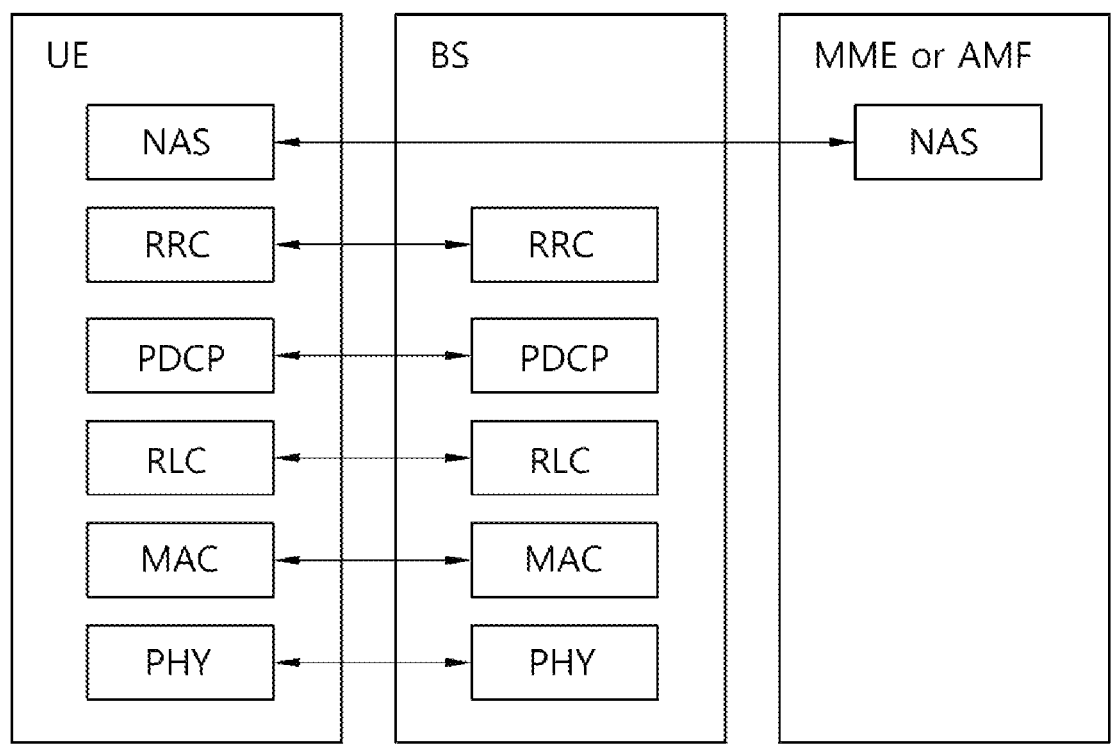

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
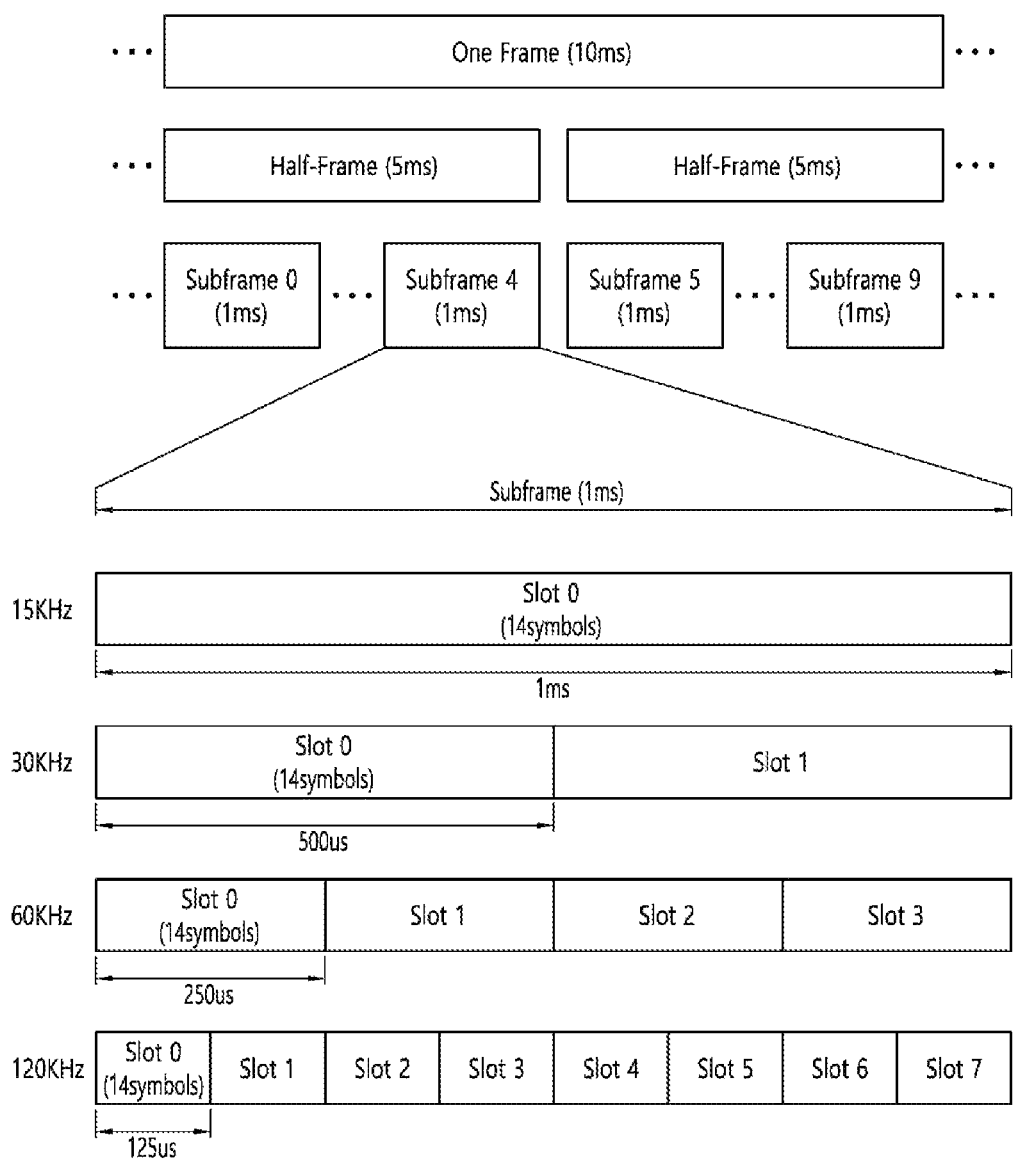
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RB s) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB} N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
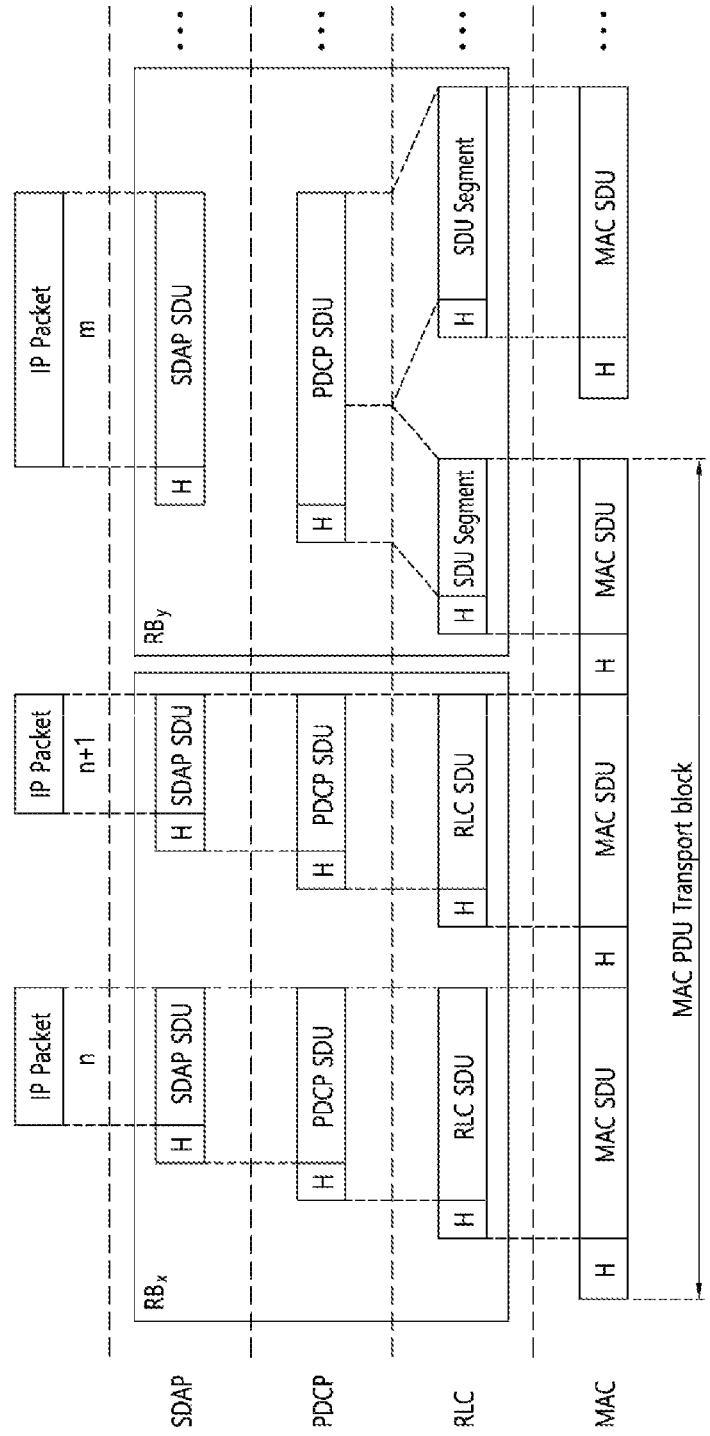
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Figure 10:
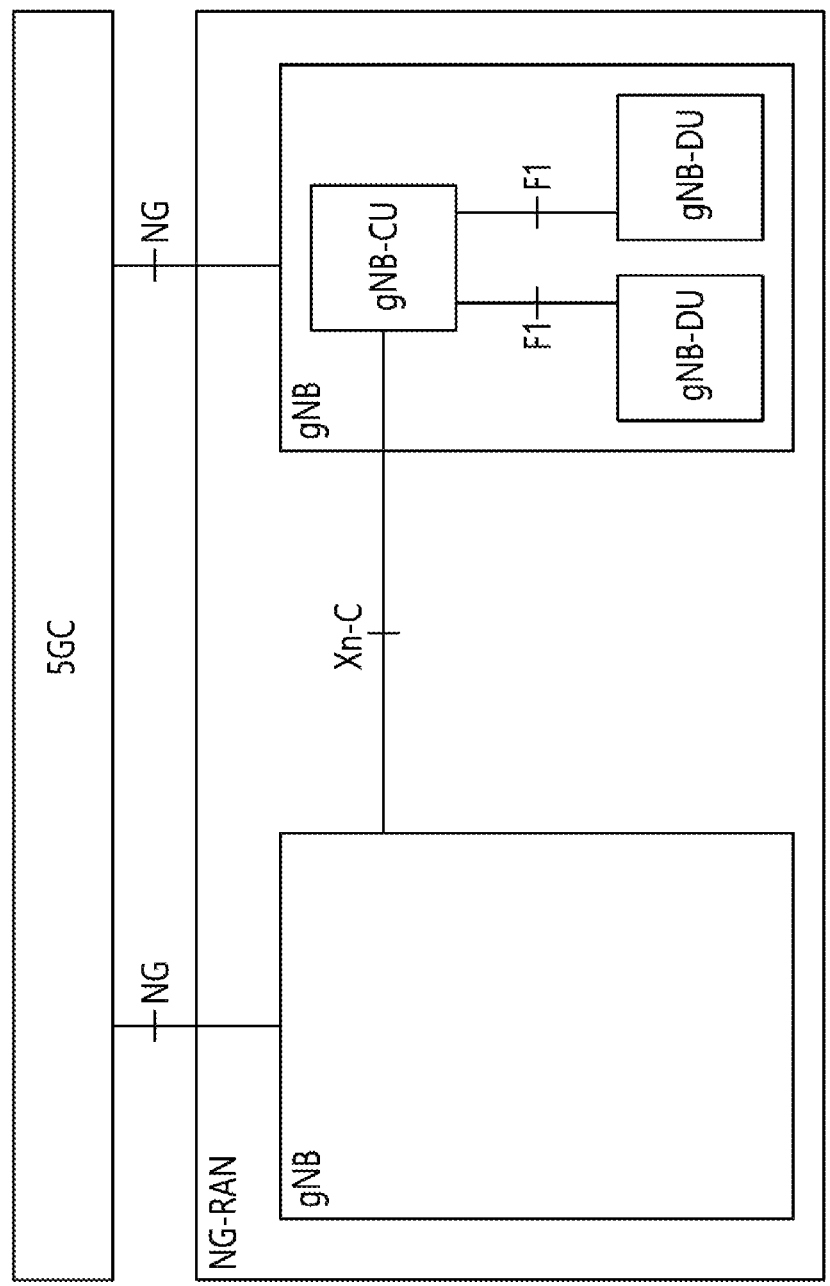
FIG. 10 shows an example of the overall architecture of an NG-RAN to which technical features of the present disclosure can be applied.

FIG. 10 shows an example of the overall architecture of an NG-RAN to which technical features of the present disclosure can be applied.

Referring to FIG. 10, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration update functions allow to inform the single network slice selection assistance information (S-NSSAI) supported by the gNB-DU.

The F1 resource coordination function is used to transfer information about frequency resource sharing between gNB-CU and gNB-DU.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU. For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. For NG-RAN, the gNB-CU provides an aggregated DRB QoS profile and QoS flow profile to the gNB-DU, and the gNB-DU either accepts the request or rejects it with appropriate cause value. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

(5) Paging Function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging assignment (PA). The gNB-DU consolidates all the paging records for a particular PO, PF and PA, and encodes the final RRC message and broadcasts the paging message on the respective PO, PF in the PA.

(6) Warning Messages Information Transfer Function

This function allows to cooperate with the warning message transmission procedures over NG interface. The gNB-CU is responsible for encoding the warning related SI message and sending it together with other warning related information for the gNB-DU to broadcast over the radio interface.

Figure 11:
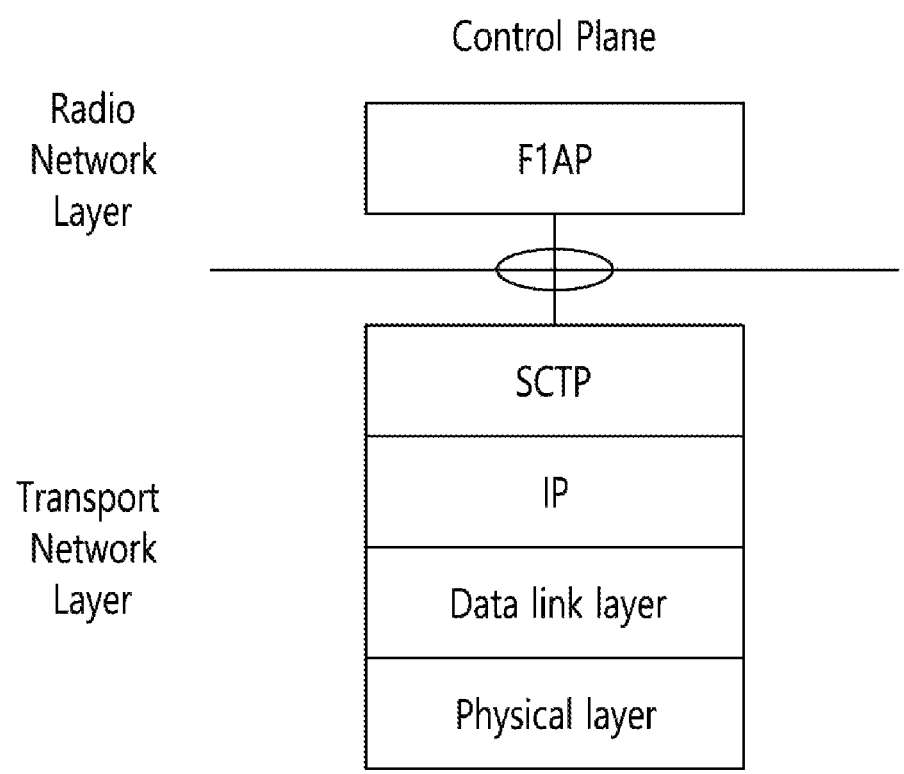
FIG. 11 shows an interface protocol structure for F1-C to which technical features of the present disclosure can be applied.

FIG. 11 shows an interface protocol structure for F1-C to which technical features of the present disclosure can be applied.

A transport network layer (TNL) is based on Internet protocol (IP) transport, comprising a stream control transmission protocol (SCTP) layer on top of the IP layer. An application layer signaling protocol is referred to as an F1 application protocol (E1AP).

According to some embodiments of the present disclosure, separation of Central Unit (CU) and Distributed Unit (DU) and separation of Control Plane (CP) and User Plane (UP) may be supported.

For example, a gNB Central Unit (gNB-CU) is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU.

For example, a gNB Distributed Unit (gNB-DU) is a logical node hosting RLC, MAC and PHY layers of the gNB or en-gNB, and its operation is partly controlled by gNB-CU. One gNB-DU supports one or multiple cells. One cell is supported by only one gNB-DU. The gNB-DU terminates the F1 interface connected with the gNB-CU.

For example, gNB-CU-Control Plane (gNB-CU-CP) is a logical node hosting the RRC and the control plane part of the PDCP protocol of the gNB-CU for an en-gNB or a gNB. The gNB-CU-CP terminates the E1 interface connected with the gNB-CU-UP and the F1-C interface connected with the gNB-DU.

For example, a gNB-CU-User Plane (gNB-CU-UP) is a logical node hosting the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU.

Hereinafter, Core Network assistance information for RAN optimization is described. Section 5.4.6 of 3GPP TS 23.501 V16.3.0 (2019-12) may be referred.

Core Network assistance information for RAN optimization may be applied to implementations of the present disclosure. For example, a traffic pattern (for example, a traffic pattern included in a subscriber information), in FIG. 12 below, may include the Core Network assistance information for RAN optimization.

Core Network assistance information for RAN aids the RAN to optimize the UE state transition steering and the RAN paging strategy formulation in RRC Inactive state. The Core Network assistance information includes the information set, Core Network assisted RAN parameters tuning, which assist RAN optimize the UE RRC state transition and CM state transition decision. It also includes the information set, Core Network assisted RAN paging information, which assist RAN to formulate an optimized paging strategy when RAN paging is triggered.

Core Network assisted RAN parameters tuning aids the RAN to minimize the UE state transitions and achieve optimum network behaviour. How the RAN uses the CN assistance information is not defined in this specification.

Core Network assisted RAN parameters tuning may be derived by the AMF per UE in the AMF based on collection of UE behaviour statistics, Expected UE Behaviour and/or other available information about the UE (such as subscribed DNN, SUPI ranges, or other information). If the AMF maintains Expected UE Behaviour parameters, Network Configuration parameters or SMF derived CN assisted RAN parameters tuning, the AMF may use this information for selecting the CN assisted RAN parameter values. If the AMF is able to derive the Mobility Pattern of the UE, the AMF may take the Mobility Pattern information into account when selecting the CN assisted RAN parameter values.

The SMF uses the SMF-Associated parameters (e.g. Expected UE Behaviour parameters or Network Configuration parameters of the UE) to derive the SMF derived CN assisted RAN parameters tuning. The SMF sends the SMF derived CN assisted RAN parameters tuning to the AMF during the PDU Session establishment procedure and if the SMF-Associated parameters change the PDU Session modification procedure is applied. The AMF stores the SMF derived CN assisted RAN parameters tuning in the PDU Session level context. The AMF uses the SMF derived CN assisted RAN parameters tuning to determine a PDU Session level "Expected UE activity behaviour" parameters set, which may be associated with a PDU Session ID.

The Expected UE Behaviour parameters or the Network Configuration parameters can be provisioned by external party via the NEF to the AMF or SMF.

The CN assisted RAN parameters tuning provides the RAN with a way to understand the UE behaviour for these aspects:

"Expected UE activity behaviour", i.e. the expected pattern of the UE's changes between CM-CONNECTED and CM-IDLE states or the duration of CM-CONNECTED state. This may be derived e.g. from the statistical information, or Expected UE Behaviour or from subscription information. The AMF derives one or more sets of the "Expected UE activity behaviour" parameters for the UE as follows:

AMF may derive and provide to the RAN a UE level of "Expected UE activity behaviour" parameters set considering the Expected UE Behaviour parameters or Network Configuration parameters received from the UDM and the SMF derived CN assisted RAN parameters tuning associated with a PDU Session using Control Plane CIoT 5GS Optimisation. This set of "Expected UE activity behaviour" parameters is valid for the UE; and AMF may provide to the RAN a PDU Session level "Expected UE activity behaviour" parameters set, e.g. considering the SMF derived CN assisted RAN parameters tuning, per established PDU Session. The PDU Session level "Expected UE activity behaviour" set of parameters is associated with and valid for a PDU Session ID. The RAN may consider the PDU Session level "Expected UE activity behaviour" parameters when the User Plane resources for the PDU Session are activated;

"Expected HO behaviour", i.e. the expected interval between inter-RAN handovers. This may be derived by the AMF e.g. from the Mobility Pattern information;

"Expected UE mobility", i.e. whether the UE is expected to be stationary or mobile. This may be derived e.g. from the statistical information or Expected UE Behaviour parameters or from subscription information;

"Expected UE moving trajectory" which may be derived e.g. from the statistical information or Expected UE Behaviour parameters or from subscription information; or "UE Differentiation Information" including the Expected UE Behaviour parameters excluding the Expected UE moving trajectory to support Uu operation optimisation for NB-IoT UE differentiation if the RAT type is NB-IoT.

The AMF decides when to send this information to the RAN as "Expected UE activity behaviour" carried in N2 request over the N2 interface.

NOTE: The calculation of the CN assistance information, i.e. the algorithms used and related criteria, and the decision when it is considered suitable and stable to send to the RAN are vendor specific.

Core Network assisted RAN paging information aids the RAN to formulate a RAN paging policy and strategy in RRC Inactive state, besides the PPI and QoS information associated to the QoS Flows.

CN assisted RAN paging information may be derived by the AMF per UE and/or per PDU Session based on collection of UE behaviour statistics, Expected UE Behaviour and/or other available information about the UE (such as subscribed DNN, SUPI ranges, Multimedia priority service), and/or information received from other network functions when downlink signalling is triggered.

The CN assisted RAN paging information consists of a service priority (values 1 to 256) which provides AN with a way to understand how important the downlink signalling is. The AMF derives this service priority based on available information as described above. The method to derive the service priority is implementation depended and can be controlled by operator.

The Core Network may provide the CN assisted RAN paging information to RAN in different occasions, e.g. during downlink N1 and N2 message delivery, etc.

Meanwhile, in NR, small data transmission in RRC-INACTIVE state could be supported. For example, context fetch and data forwarding (with and without anchor relocation) in INACTIVE state could be supported, as Random Access Channel (RACH)-based solutions.

However, the mechanisms to deliver the NAS PDU between the new NG-RAN and the last serving NG-RAN are not defined.

Therefore, studies for fast small data transmission in a wireless communication system are needed.

In the present disclosure, how to deliver the NAS PDU between both NG-RANs may be considered.

In small data transmission in RRC-INACTIVE state, the last serving NG-RAN should decide whether the UE context relocation is required or not. For example, the last serving NG-RAN may need to know that there is subsequent UL and/or DL data transmission for the UE.

The UE may be able to send the AS-Release Assistance Information (AS-RAI) indicating no further Uplink and Downlink Data transmission. However, when the UE moves to a new NG-RAN, this information may be difficult to be delivered to the last serving NG-RAN. In addition, for the control plane (CP) small data, the last serving NG-RAN may need to report to the AMF the current UE location.

In the present disclosure, how to indicate the information on whether there is subsequent UL and/or DL data transmission for the UE or not may be considered.

Hereinafter, a method for fast small data transmission in a wireless communication system, according to some embodiments of the present disclosure, will be described.

Figure 12:
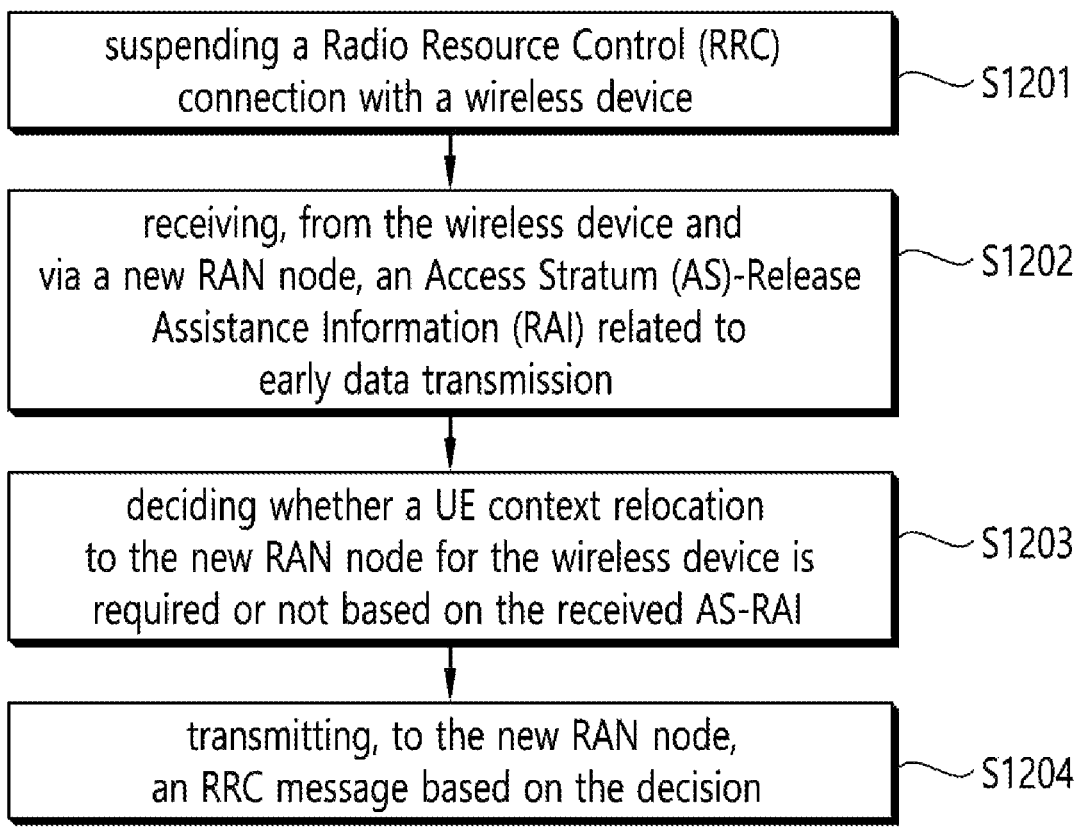
FIG. 12 shows an example of a method for fast small data transmission in a wireless communication system.

FIG. 12 shows an example of a method for fast small data transmission in a wireless communication system.

In particular, FIG. 12 shows an example of a method performed by a last serving Radio Access Network (RAN) node in a wireless communication system.

For example, the last serving RAN node may be connected with a new-RAN node and a core network node (for example, 5GC).

In step S1201, a last serving RAN node may suspend a Radio Resource Control (RRC) connection with a wireless device.

For example, a last serving RAN node may release the RRC connection with a wireless device with suspend.

In step S1202, a last serving RAN node may receive, from the wireless device and via a new RAN node, an Access Stratum (AS)-Release Assistance Information (RAI) related to early data transmission. For example, the AS-RAI may inform whether there is Uplink (UL) data transmission and/or Downlink (DL) data transmission for the wireless device subsequent to the early data transmission, or not.

For example, the AS-RAI may inform (1) no further Uplink (UL) data transmission and/or Downlink (DL) data transmission, or (2) only a single DL data transmission for the wireless device subsequent to the early data transmission.

According to some embodiments of the present disclosure, the AS-RAI may be included in a Medium Access Control (MAC)-Control Element (CE), which is transmitted to the new RAN node from the wireless device.

In other words, the wireless device may transmit, to the new RAN node, the MAC-CE including the AS-RAI. Then, the new RAN node may forward the AS-RAI to the last serving RAN node.

According to some embodiments of the present disclosure, the AS-RAI may be included in an RRC resume request message, which is transmitted to the new RAN node from the wireless device.

In other words, the wireless device may transmit, to the new RAN node, the RRC resume request message including the AS-RAI. Then, the new RAN node may forward the AS-RAI to the last serving RAN node.

In step S1203, a last serving RAN node may decide whether a UE context relocation to the new RAN node for the wireless device is required or not based on the received AS-RAI.

For example, a last serving RAN node may decide whether to keep a connection with a core network node for the wireless device or not based on the AS-RAI.

According to some embodiments of the present disclosure, a last serving RAN node may receive, from a core network node, a subscription information including a traffic pattern. For example, the last serving RAN node may decide whether the UR context relocation to the new RAN node for the wireless device is required or not, based on the received AS-RAI and/or the traffic pattern included in the subscription information.

For example, a last serving RAN node may decide whether to keep a connection with a core network node for the wireless device or not based on the AS-RAI and/or the traffic pattern included in the subscription information.

According to some embodiments of the present disclosure, a last serving RAN node may receive, from the new RAN node, a location information for a wireless device. For example, the last serving RAN node may decide whether the UR context relocation to the new RAN node for the wireless device is required or not based on at least one of the received AS-RAI, the traffic pattern included in the subscription information, and/or the location information.

According to some embodiments of the present disclosure, a last serving RAN node may receive, from the new RAN node, a UE context request message for the wireless device. For example, the AS-RAI may be included in the UE context request message. For example, the last serving RAN node may receive, from the new RAN node, RETRIEVE UE CONTEXT REQUEST message including the AS-RAI.

According to some embodiments of the present disclosure, a last serving RAN node may decide whether the UE context relocation to the new RAN node is required or not, based on expected size of data transmission.

For example, when the expected size of data transmission based on the AS-RAI and the traffic pattern included in the subscriber information is less than or equal to a predetermined threshold value, a last serving RAN node may decide not to relocate the UE context for the wireless device.

For example, when the AS-RAI informs that only small data transmission subsequent to the early data transmission are expected, the last serving RAN node may decide not to relocate the UE context for the wireless device.

For example, when the AS-RAI informs no further Uplink (UL) data transmission and/or Downlink (DL) data transmission subsequent to the early data transmission, the last serving RAN node may decide not to relocate the UE context for the wireless device.

For example, when (1) the AS-RAI informs no further Uplink (UL) data transmission and/or Downlink (DL) data transmission, or (2) the AS-RAI informs only a single DL data transmission for the wireless device subsequent to the early data transmission, the last serving RAN node may decide not to relocate the UE context for the wireless device.

For example, when (1) the AS-RAI informs that only small data transmission subsequent to the early data transmission are expected, and (2) the traffic pattern in the subscriber information informs that only small data transmission is expected for the wireless device, the last serving RAN node may decide not to relocate the UE context for the wireless device.

For example, when (1) the AS-RAI informs no further Uplink (UL) data transmission and/or Downlink (DL) data transmission, (2) the AS-RAI informs only a single DL data transmission for the wireless device subsequent to the early data transmission, and/or (3) the traffic pattern in the subscriber information informs that no UL data transmission and/or DL data transmission is expected for the wireless device, the last serving RAN node may decide not to relocate the UE context for the wireless device.

For example, when (1) the AS-RAI informs no further Uplink (UL) data transmission and/or Downlink (DL) data transmission, or (2) the AS-RAI informs only a single DL data transmission for the wireless device subsequent to the early data transmission, and (3) the traffic pattern in the subscriber information informs that only a small data transmission is expected for the wireless device, the last serving RAN node may decide not to relocate the UE context for the wireless device.

For other example, when the expected size of data transmission based on the AS-RAI and the traffic pattern included in the subscriber information is greater than a predetermined threshold value, a last serving RAN node may decide to relocate the UE context or the wireless device to the new RAN node.

According to some embodiments of the present disclosure, a last serving RAN node may decide whether the UE context relocation to the new RAN node is required or not, based on a location of the wireless device.

For example, when the wireless device is located at an edge of the new RAN node, the last serving RAN node may decide not to relocate the UE context for the wireless device.

For other example, when the wireless device is located at a center of the new RAN node, the last serving RAN node may decide to relocate the UE context for the wireless device.

According to some embodiments of the present disclosure, a last serving RAN node may decide that the UE context relocation to the new RAN node is not required. In this case, a wireless device could perform fast small data transmission with a core network via the new RAN node and the last serving RAN node without the UE context relocation.

In other words, even though the wireless device performs the RACH procedure with the new RAN node, the last serving RAN node may keep the UE context and NG connection with the core network and perform operations as a serving RAN node. Then, the new RAN node may forward UL data and/or DL data between the last serving RAN node and the wireless device.

According to some embodiments of the present disclosure, a last serving RAN node may decide that the UE context relocation to the new RAN node is required. In this cast, the new RAN node may receive the UE context from the last serving RAN node and become a serving RAN node. Then, the new RAN node may perform UL data transmission and/or DL data transmission with the wireless device.

In step S1204, a last serving RAN node may transmit, to the new RAN node, an RRC message based on the decision.

For example, the RRC message may include a tunnel information to establish a data forwarding tunnel, from the new RAN node to a core network node via the last serving RAN node, for the wireless device. For example, the RRC message may include the tunnel information based on the decision that the UE context relocation to the new RAN node for the wireless device is not required.

For example, a last serving RAN node may transmit, to the new RAN node, the RETRIEVE UE CONTEXT RESPONSE message or new message including the UL UP TNL Information to establish a UL data forwarding tunnel.

For example, if there is no DL data transmission subsequent to the UL data, the last serving RAN node may send the RETRIEVE UE CONTEXT FAILURE message instead of the RETRIEVE UE CONTEXT RESPONSE message. In this case, the last serving RAN node may also generates the RRC Release message to indicate to the UE that the RRC connection is release.

According to some embodiments of the present disclosure, a last serving RAN node may transmit, to a core network node, a Small Data Transmission indication for the early data transmission based on the received AS-RAI.

For example, the Small Data Transmission indication may inform that (1) the early data transmission is triggered by the wireless device and (2) the early data transmission is performed via the new RAN node and last serving RAN node without UE context relocation.

For example, the Small Data Transmission indication may inform that whether there is UL data transmission and/or DL data transmission for the wireless device.

For example, the last serving RAN node may transmit, to the core network node, an NGAP UL NAS TRANSPORT message including the Small Data Transmission indication.

According to some embodiments of the present disclosure, a last serving RAN node may receive, from a core network node, an END indication to inform that no further data or signalling is expected with the wireless device. In this case, a last serving RAN node may transmit, to the new RAN node, a UE context failure message for the wireless device.

For example, the RRC message may be included in the UE context failure message and inform the wireless device to be in an RRC inactive state.

According to some embodiments of the present disclosure, a last serving RAN node may receive, from a core network node, a state transition required message to resume the RRC connection for the wireless device. In this case, a last serving RAN node may transmit, to the new NG-RAN, a UE context response message for the wireless device. For example, the last serving RAN node may transmit, to the new RAN node, UE context for the wireless device.

For example, the RRC message may be included in the UE context response message and inform the wireless device to enter an RRC connected state.

According to some embodiments of the present disclosure, a wireless device may perform an early data transmission while in RRC inactive state. For example, the wireless device may perform a UL data transmission while in a RACH procedure with the new RAN node.

For example, a wireless device may transmit, to the new RAN node, a RRC EDT request message (or another RRC message) including a NAS-PDU. In this case, the RRC EDT request message (or another RRC message) may include an AS-RAI and/or an information for small data transmission.

For example, when the last serving RAN node decides not to relocate the UE context for the wireless device, the new RAN node may forward the received UL data to the last serving RAN node.

For other example, when the last serving RAN node decides to relocate the UE context for the wireless device, the new RAN node may forward the received UL data to the core network node.

According to some embodiments of the present disclosure, the traffic pattern (for example, the traffic pattern included in the subscriber information), in step S1203, may include expected behavior of the wireless device parameters (for example, expected UE behavior parameters).

Table 5 shows examples of the expected behavior parameters.

TABLE 5

| Expected Behavior parameter | Description |
| --- | --- |
| Expected UE Moving | Identifies the UE's expected geographical movement |

TABLE 5-continued

| Expected Behavior parameter | Description |
| --- | --- |
| Trajectory | Example: A planned path of movement |
| Stationary Indication | Identifies whether the UE is stationary or mobile [optional] |
| Communication Duration Time | Indicates for how long the UE will normally stay in CM-Connected for data transmission. Example: 5 minutes. [optional] |
| Periodic Time | Interval Time of periodic communication Example: every hour. [optional] |
| Scheduled Communication Time | Time and day of the week when the UE is available for communication. Example: Time: 13:00-20:00, Day: Monday. [optional] |
| Battery Indication | Identifies power consumption criticality for the UE: if the UE is battery powered with not rechargeable/not replaceable battery, battery powered with rechargeable/replaceable battery, or not battery powered. [optional] |
| Traffic Profile | Identifies the type of data transmission: single packet transmission (UL or DL), dual packet transmission (UL with subsequent DL or DL with subsequent UL), multiple packets transmission [optional] |
| Scheduled Communication Type | Indicates that the Scheduled Communication Type is Downlink only or Uplink only or Bi-directional [To be used together with Scheduled Communication Time] Example: <Scheduled Communication Time>, DL only. [optional] |

According to some embodiments of the present disclosure, the traffic pattern (for example, the traffic pattern included in the subscriber information), in step S1203, may include Secondary RAT Usage Information. Table 6 shows an example of the Secondary RAT Usage Information.

For example, this IE may provide information on the secondary resources used with MR-DC.

TABLE 6

| IE/Group Name | Presence | Range | IE type and reference | Semantics description |
| --- | --- | --- | --- | --- |
| PDU Session Usage Report | | 0 . . . 1 | | |
| >RAT Type | M | | ENUMERATED (nR, e-UTRA, . . .) | |
| >PDU Session Timed Report List | M | | Volume Timed Report List | |
| QoS Flows Usage Report List | | 0 . . . 1 | | |
| >QoS Flow Usage Report Item | | 1 . . . <maxnoofQoSFlows> | | |
| >>QoS Flow Indicator | M | | | |
| >>RAT Type | M | | ENUMERATED (nR, e-UTRA, . . .) | |
| >>QoS Flows Timed Report List | M | | Volume Timed Report List | |

According to some embodiments of the present disclosure, the traffic pattern (for example, the traffic pattern included in the subscriber information), in step S1203, may include Volume Timed Report List.

Table 7 shows an example of the Volume Timed Report List.

For example, This IE provides information on the data usage.

TABLE 7

| IE/Group Name | Presence | Range | IE type and reference | Semantics description |
|---|---|---|---|---|
| Volume Timed Report Item | | 1 . . . <maxnoofTimePeriods> | | |
| >Start Timestamp | M | | OCTET STRING (SIZE(4)) | UTC time encoded in the same format as the first four octets of the 64-bit timestamp format. It indicates the start time of the collecting period of the included Usage Count UL IE and Usage Count DL IE. |
| >End Timestamp | M | | OCTET STRING (SIZE(4)) | UTC time encoded in the same format as the first four octets of the 64-bit timestamp format. It indicates the end time of the collecting period of the included Usage Count UL IE and Usage Count DL IE. |
| >Usage Count UL | M | | INTEGER $(0 \ldots 2^{64} - 1)$ | The unit is: octets. |
| >Usage Count DL | M | | INTEGER $(0 \ldots 2^{64} - 1)$ | The unit is: octets. |

According to some embodiments of the present disclosure, for the RRC_INACTIVE state, UL small data transmissions for RACH-based schemes (for example, 2-step and 4-step RACH) could be supported. For example, general procedure to enable UP data transmission for small data packets from INACTIVE state (for example, using MSGA or MSG3) could be supported.

For example, a network could support to enable flexible payload sizes larger than the CCCH message size that is possible currently for INACTIVE state for MSGA and MSG3 to support UP data transmission in UL (for example, actual payload size can be up to network configuration).

For example, a network could support context fetch and data forwarding (with and without anchor relocation) in INACTIVE state for RACH-based solutions.

Hereinafter, a method for CP small data transmission in RRC-INACTIVE state without UE context relocation between NG-RANs, according to some embodiments of the present disclosure, will be described.

According to some embodiments of the present disclosure, the UE may include the additional information for SDT by using RRC message or MAC CE. When the last serving NG-RAN decides not to relocate the UE context, the last serving NG-RAN may need to indicate to the new NG-RAN or the DU (of new NG-RAN in CU-DU split case) whether the multiple UL/DL transmission is allowed and how the configuration for multiple UL/DL transmission is allocated.

According to some embodiments of the present disclosure, a new NG-RAN may send the RAI and NAS PDU to the last serving NG-RAN, in order to deliver the NAS PDU between both NG-RANs and to indicate to the last serving NG-RAN the information on whether there is subsequent UL and/or DL data transmission for the UE or not.

In addition, the last serving NG-RAN may also indicate to the AMF that the small data transmission in RRC-INACTIVE state is triggered. Based on the information, the AMF can inform the last serving NG-RAN of no further subsequent DL data from network point of view.

Figure 13:
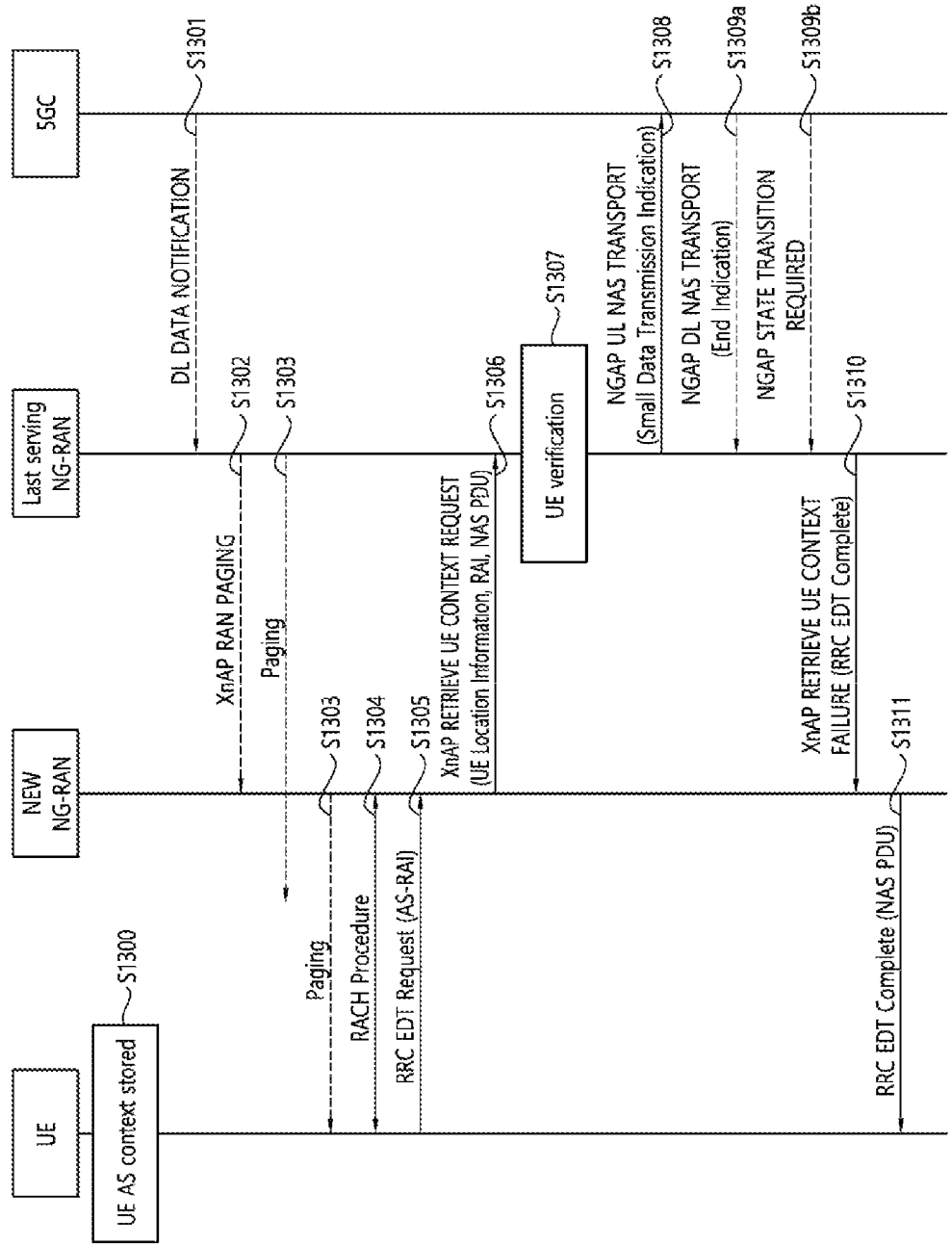
FIG. 13 shows an example of a procedure for CP small data transmission performed by a new NG-RAN and a last serving NG-RAN.

FIG. 13 shows an example of a procedure for CP small data transmission performed by a new NG-RAN and a last serving NG-RAN.

In particular, FIG. 13 may illustrate a diagram of the procedure for CP small data transmission in RRC-INACTIVE state without UE context relocation between NG-RANs.

In step S1300, the UE may be in RRC-INACTIVE state. The UE and last serving NG-RAN may store the UE context, respectively. The NG-C connection between last serving NG-RAN and AMF may be maintained. In addition, the NG-U connection between last serving NG-RAN and 5GC (for example, UPF) may be maintained.

According to some embodiments of the present disclosure, before the state transition to RRC-INACTIVE, the AMF may request the last serving NG-RAN to report whenever the UE changes cell.

In step S1301, the last serving NG-RAN may receive DL data on NG-U interface.

In step S1302, the last serving NG-RAN may send the XnAP RAN PAGING message to the neighbor NG-RANs in same RAN-based notification area (RNA).

In step S1303, each NG-RAN may send Paging message to UE.

For example, steps S1301 to S1303 may be needed only in case of DL data.

In step S1304, when the UE is being paged, or when new data arrives in the uplink buffer, the UE may initiate the RACH procedure. For example, the UE may move into new NG-RAN.

In step S1305, the UE may resume the connection by sending an RRC EDT Request message or new message to new NG-RAN. The uplink user data may be transmitted in a NAS message concatenated in RRC EDT Request message on CCCH. RRC EDT Request message may include Inactivity-Radio Network Temporary Identity (I-RNTI) of the UE, the RRC resume cause, and authentication token (for example, Resume MAC-I).

For example, the RRC EDT Request message may also include AS-Release Assistance information (for example, by using BSR, MAC CE) indicating:

No further Uplink and Downlink Data transmission, or

Only a single Downlink Data transmission subsequent to the Uplink transmission.

For example, for CU-DU split in NG-RAN, based on the information from the UE, the DU may indicate to the CU whether there is subsequent UL and/or DL data transmission.

For example, the UE may include the following additional information for SDT in the RRC EDT Request message:

Expected UL data size, and/or

Buffer status report, and/or

Traffic pattern, and/or

Preference for state transition to RRC-CONNECTED, and/or

Indication for multiple transmission for UL without transition to RRC-CONNECTED (for example, since UE has a single UL data packet which is larger than TBS of Msg3/MsgA or UE has multiple UL data packets, in which the size of each packet is smaller than TBS of Msg3/MsgA). For multiple UL transmission, this indication may include the requested number of UL grant (for PUSCH resource) occasions, requested transport block size (TBS), requested periodicity for UL grant (for PUSCH resource) occasions and time offset until the first UL grant (for PUSCH resource). This indication may also include the expected or requested number of UL RRC message to transmit UL data packets.

For example, the additional information for SDT may be sent to the new NG-RAN by using the MAC CE. In this case, the DU in the new NG-RAN can be aware that the UE needs multiple UL transmission to deliver the UL data in RRC-INACTIVE state.

In step S1306, on receiving the message from the UE, the new NG-RAN may check first whether it is able to find the UE context or not. If not, the new NG-RAN may resolve the node identity contained in the I-RNTI, and request the last serving NG-RAN to provide UE context by initiating the XnAP Retrieve UE Context procedure with NAS PDU from the UE. Alternatively, the XnAP UL RRC MESSAGE TRANSFER message or new message may be used instead of the RETRIEVE UE CONTEXT REQUEST message.

The RETRIEVE UE CONTEXT REQUEST message may include the UE location information to indicate to the AMF the current UE location. The additional information for SDT may be also sent to the last serving NG-RAN. In addition, the RAI may be included into this message to notify the last serving NG-RAN of the information of whether there is subsequent UL and/or DL data transmission.

If the UE does not include the AS-RAI in the RRC EDT Request message in step S1305, the RETRIEVE UE CONTEXT REQUEST message may include the information to indicate small data transmission in RRC-INACTIVE state to the last serving NG-RAN.

In step S1307, the last serving NG-RAN may check whether it is able to find the UE context or not. If yes, the last serving NG-RAN may decide whether the UE context relocation to the new NG-RAN is required or not. Based on the RAI/additional information for SDT from the UE and/or the traffic pattern in subscription information from 5GC, the last serving NG-RAN may decide to keep the UE context and the UE-associated NG connection with the serving AMF and UPF for the frequent small data transmission (for example, single PDCP PDUs in uplink and/or single PDCP PDUs in downlink).

In step S1308, if the last serving NG-RAN decides to keep the UE context and the UE-associated NG connection with the serving AMF and UPF in step S1307, the last serving NG-RAN may send to the AMF the NGAP UL NAS TRANSPORT message containing the NAS PDU. The Small Data Transmission Indication may be also included to indicate to the AMF that the small data transmission in RRC-INACTIVE state is triggered by the UE. Based on the RAI from the UE, the last serving NG-RAN may be able to inform of whether there is subsequent UL and/or DL data transmission by using the Small Data Transmission Indication. This indication may also indicate that the small data is sent to the AMF via the new NG-RAN and last serving NG-RAN (for example, without UE context relocation).

The NGAP UL NAS TRANSPORT message may also include the request for allocation of a new security context (for example, Next-hop chaining count, Next-hop NH) for next RRC state transition.

For example, if the AMF requests the last serving NG-RAN to report whenever the UE changes cell, the last serving NG-RAN may send the UE location information to the AMF by using this NGAP message or subsequent LOCATION REPORT message.

In step S1309a, when there is only a single DL data transmission subsequent to the UL NAS PDU, the AMF may send the DL NAS TRANSPORT message containing the DL NAS PDU. When receiving the Small Data Transmission Indication in step S1308, the AMF may include End Indication in the DL NAS TRANSPORT message to indicate that no further data or signalling is expected with UE.

In step S1309b, if there is no DL data to the UE but the AMF wants to keep the UE into the RRC-CONNECTED state (for example, for charging, request from other network functions (NFs)), the AMF may send the NGAP STATE TRANSITION REQUIRED message or new message.

Based on the request for allocation of a new security context from the last serving NG-RAN, and/or the indication for SDT, and/or the subscription information, the AMF may allocate new security context and send the new security context to last serving NG-RAN by using NGAP STATE TRANSITION REQUIRED message or new message.

In step S1310, when the last serving NG-RAN receives the DL NAS TRANSPORT message including the End Indication in step S1309a, the last serving NG-RAN may generate the RRC EDT Complete message or new message containing the NAS PDU in order to forward the DL NAS PDU to the UE and to indicate to the UE that the RRC connection is released.

Then, the last serving NG-RAN may send the XnAP RETRIEVE UE CONTEXT FAILURE message or new message containing the RRC message. If the UL RRC MESSAGE TRANSFER message is used in step S1306, the DL RRC MESSAGE TRANSFER message may be used instead of the RETRIEVE UE CONTEXT FAILURE message.

The last serving NG-RAN may also include indication on whether multiple transmission for UL is needed without transition to RRC-CONNECTED state in a message to the new NG-RAN.

Also, the last serving NG-RAN can also indicate to the new NG-RAN whether there is DL data transmission subsequent to the UL data and whether multiple transmission for DL is needed without transition to RRC-CONNECTED state. These indications for multiple UL/DL transmission may also include the information on the configured number of UL/DL grant occasions, configured TBS, expected number of UL/DL RRC message to transmit the user data packets, and so on.

On the other hand, in step S1310, when receiving the STATE TRANSITION REQUIRED message in step S1309b, the last serving NG-RAN may transfer the UE context to the new NG-RAN by using the RETRIEVE UE CONTEXT RESPONSE message in order to request the state transition from the RRC-INACTIVE to RRC-CONNECTED.

In step S1311, when the new NG-RAN receives the RETRIEVE UE CONTEXT FAILURE message, the new NG-RAN may transparently forward the RRC message to the UE. The UE may be still the RRC-INACTIVE state. When the new NG-RAN is aware that the UE needs multiple UL transmission and/or DL transmission to transmit the UL/DL data packets without transition to RRC-CONNECTED state, the RRC message and contention resolution ID may be multiplexed into same MAC PDU for multiple UL/DL transmission. The multiple UL/DL transmission may be performed by using RRC message.

On the other hand, in step S1311, When the new NG-RAN receives the RETRIEVE UE CONTEXT RESPONSE message, the new NG-RAN may become the serving NG-RAN, and generate the RRC Resume message for the UE. Then the UE may enter into the RRC-CONNECTED state.

FIGS. 14A and 14B show an example of a procedure for CP small data transmission performed by a new NG-RAN and a last serving NG-RAN considering CU-DU split.

In particular, FIGS. 14A and 14B may illustrate a diagram of the procedure for CP small data transmission in RRC-INACTIVE state without UE context relocation between NG-RANs considering CU-DU split.

For example, a new NG-RAN may include a DU and a CU-CP. A last serving NG-RAN may include a CU-CP.

In step S1400, the UE may be in RRC-INACTIVE state. The UE and last serving NG-RAN may store the UE context, respectively. The NG-C connection between last serving NG-RAN and AMF may be maintained. In addition, the NG-U connection between last serving NG-RAN and UPF may be maintained.

According to some embodiments of the present disclosure, before the state transition to RRC-INACTIVE, the AMF may request the last serving NG-RAN to report whenever the UE changes cell.

In step S1401, when new data arrives in the uplink buffer, the UE may initiate the RACH procedure for small data transmission (SDT) in RRC-INACTIVE state. For example, it may be assumed that the UE moves into new NG-RAN.

In step S1402, the UE may resume the connection by sending an RRC EDT Request message or new message to new NG-RAN. The uplink user data may be transmitted in a NAS message concatenated in RRC EDT Request message on CCCH. The UE may include I-RNTI of the UE, the RRC resume cause (for small data transmission in RRC-INACTIVE), and authentication token (for example, Resume MAC-I) in the RRC EDT Request message.

For example, the UE may include the following additional information for SDT in the RRC EDT Request message:
  Expected UL data size, and/or
  Buffer status report, and/or
  Traffic pattern, and/or
  Preference for state transition to RRC-CONNECTED, and/or
  Indication for multiple transmission for UL without transition to RRC-CONNECTED (for example, since UE has a single UL data packet which is larger than TBS of Msg3/MsgA or UE has multiple UL data packets, in which the size of each packet is smaller than TBS of Msg3/MsgA). For multiple UL transmission, this indication may include the requested number of UL grant (for PUSCH resource) occasions, requested transport block size (TBS), requested periodicity for UL grant (for PUSCH resource) occasions and/or time offset until the first UL grant (for PUSCH resource). This indication may also include the expected or requested number of UL RRC message to transmit UL data packets.

The RRC EDT Request message may also include AS-Release Assistance information (for example, by using BSR, MAC CE or RRC message) indicating:
  No further uplink and downlink data transmission, or
  Only a single downlink data transmission subsequent to the uplink transmission.

In step S1403, the DU in the new NG-RAN may send the INITIAL UL RRC MESSAGE TRANSFER message containing the RRC EDT Request message to the CU-CP in new NG-RAN. If AS-RAI is delivered by MAC CE, the DU may also include this information into the INITIAL UL RRC MESSAGE TRANSFER message.

For example, in step S1402, the additional information for SDT may be sent to the new NG-RAN by using the MAC CE. In this case, the DU in the new NG-RAN can be aware that the UE needs multiple UL transmission to deliver the UL data in RRC-INACTIVE state. However, since the DU has no knowledge of whether this RLC bearer (or the service or the UE) used by UL data transmission is allowed for SDT and whether the CU-CP may decide to transit to RRC-CONNECTED state, the DU may need to indicate this information to the CU-CP by using the INITIAL UL RRC MESSAGE TRANSFER message.

In step S1404, on receiving the message from the UE, the CU-CP in the new NG-RAN may first check whether it is able to find the UE context or not. If not, the CU-CP in the new NG-RAN may resolve the node identity contained in the I-RNTI, and request the last serving NG-RAN to provide UE context by initiating the XnAP Retrieve UE Context procedure. Alternatively, the XnAP UL RRC MESSAGE TRANSFER message or new message may be used instead of the RETRIEVE UE CONTEXT REQUEST message.

The CU-CP of new NG-RAN may include the UE location information to indicate to the AMF the current UE location in a message to the CU-CP of the last serving NG-RAN. The additional information for SDT is also sent to the last serving NG-RAN. In addition, the RAI may be included into this message to notify the last serving NG-RAN of the information of whether there is UL/DL data transmission subsequent to this uplink transmission. If the UE does not include the AS-RAI in the RRC EDT Request message in step S1402, the CU-CP in the new NG-RAN may include the information to indicate small data transmission in RRC-INACTIVE state to the last serving NG-RAN in a message to the CU-CP of the last serving NG-RAN.

For example, the CU-CP of last serving NG-RAN may fail to find the UE context or decide to relocate the UE context to new NG-RAN. In this case, the CU-UP of last serving NG-RAN may forward the received UL data to the new NG-RAN again. To avoid this problem, the CU-CP of new NG-RAN may store a copy of the NAS-PDU containing the UL data until receiving the response of the RETRIEVE UE CONTEXT REQUEST message. That is, when the RETRIEVE UE CONTEXT RESPONSE message is received, the CU-CP of new NG-RAN may send the NAS-PDU to AMF directly.

In step S1405, the CU-CP in the last serving NG-RAN may check whether the CU-CP is able to find the UE context or not. If yes, the CU-CP may decide whether the UE context relocation to the new NG-RAN is required or not. Based on the RAI/additional information for SDT from the UE and/or the traffic pattern in subscription information from 5GC, the CU-CP in the last serving NG-RAN may decide to keep the UE context and the UE-associated NG connection with the serving AMF and UPF for the frequent small data transmission (for example, single PDCP PDUs in uplink and/or single PDCP PDUs in downlink).

In step S1406, if the CU-CP of the last serving NG-RAN decides to keep the UE context and the UE-associated NG connection with the serving AMF and UPF in step S1405, the CU-CP may send to the AMF the NGAP UL NAS TRANSPORT message containing the NAS PDU. The Small Data Transmission Indication may be also included to indicate to the AMF that the small data transmission in RRC-INACTIVE state is triggered by the UE. Based on the RAI/additional information for SDT from the UE, the CU-CP of last serving NG-RAN may be inform of whether there is subsequent UL/DL data transmission by using the Small Data Transmission Indication. This indication may indicate that the small data is sent to the AMF via the new NG-RAN and last serving NG-RAN (for example, without UE context relocation).

The last serving NG-RAN may also include the request for allocation of a new security context (for example, Next-hop chaining count, Next-hop NH) for next RRC state transition in the NGAP UL NAS TRANSPORT message.

For example, for the case where the AMF requests the last serving NG-RAN to report whenever the UE changes cell, the last serving NG-RAN may send the UE location information to the AMF by using this NGAP message or subsequent NGAP LOCATION REPORT message.

In step S1407, when there is only a single DL data transmission subsequent to the UL NAS PDU, the AMF may send the DL NAS TRANSPORT message containing the DL NAS PDU. When receiving the Small Data Transmission Indication in step S1406, the AMF may include End Indication to indicate that no further data or signalling is expected with UE in the DL NAS TRANSPORT message.

If there is no DL data to the UE but the AMF wants to keep the UE into the RRC-CONNECTED state (for example, for charging, request from other NFs), the AMF may send the NGAP STATE TRANSITION REQUIRED message or new message.

Based on the request for allocation of a new security context from the last serving NG-RAN, and/or the indication for SDT, and/or the subscription information, the AMF may allocate new security context and send the new security context to last serving NG-RAN by using NGAP STATE TRANSITION REQUIRED message or new message.

In step S1408, when the CU-CP of last serving NG-RAN receives the DL NAS TRANSPORT message including the End Indication in step S1407, the CU-CP of last serving NG-RAN generates the RRC EDT Complete message or new message containing the NAS-PDU in order to forward the DL NAS-PDU to the UE and to indicate to the UE that the RRC connection is released. When the CU-CP of last serving NG-RAN receives the DL NAS TRANSPORT message in step S1407 but there is multiple DL transmission, the CU-CP of last serving NG-RAN may generate the RRC EDT message or new message containing the NAS-PDU.

Based on additional information for SDT from UE or the information (for example, subscription information, END indication) from AMF, the CU-CP in the last serving NG-RAN may include indication on whether multiple transmission for UL is needed without transition to RRC-CONNECTED state in a message to the new NG-RAN.

Also, the CU-CP of last serving NG-RAN can also indicate to the new NG-RAN whether there is DL data transmission subsequent to the UL data and whether multiple transmission for DL is needed without transition to RRC-CONNECTED state. These indications for multiple UL/DL transmission may also include the information on the configured number of UL/DL grant occasions, configured TBS, expected number of UL/DL RRC message to transmit the user data packets, and so on.

For example, the CU-CP of last serving NG-RAN may send the XnAP RETRIEVE UE CONTEXT FAILURE message or new message containing the RRC message. If the UL RRC MESSAGE TRANSFER message is used in step S1404, the DL RRC MESSAGE TRANSFER message may be used instead of the RETRIEVE UE CONTEXT FAILURE message. When the RRC messages used for multiple UL/DL transmission are sent via SRB2 (for example, UL Information Transfer and DL Information Transfer), the CU-CP of last serving NG-RAN may also include the information to establish the SRB2 of the new NG-RAN into the XnAP RETRIEVE UE CONTEXT FAILURE message or XnAP DL RRC MESSAGE TRANSFER message or new message.

For example, when the CU-CP of last serving NG-RAN receives the STATE TRANSITION REQUIRED message in step S1407, the last serving NG-RAN should transfer the UE context to the new NG-RAN by using the RETRIEVE UE CONTEXT RESPONSE message in order to request the state transition from the RRC-INACTIVE to RRC-CONNECTED.

For example, by using RRC message, the CU-CP of last serving NG-RAN may indicate to the UE that the multiple UL/DL transmission is allowed and the configuration for multiple UL/DL transmission is allocated.

For example, if the F1-U and Xn-U tunnel are used for multiple UL/DL transmission as in FIGS. 15, 16A, and 16B below, the information to establish the user plane tunnel may should be included into this message instead of the SRB2 setup request.

In step S1409, when the information to establish the SRB2 is received, the CU-CP in new NG-RAN may initiate the UE Context Setup procedure towards the DU in order to establish the SRB2 for the UE. The UE CONTEXT SETUP REQUEST message may include the RRC message and the information received in step S1408.

For example, if the RRC messages used for multiple UL/DL transmission are sent via SRB1, the F1AP DL RRC MESSAGE TRANSFER message can be used instead of the F1AP UE CONTEXT SETUP REQUEST message. If the information to establish the F1-U and Xn-U tunnel is received in step S1408, the F1AP UE CONTEXT SETUP REQUEST message may include this information.

In step S1410, on reception of the message in step S1409, the DU of new NG-RAN may be now aware that the UE needs multiple UL transmission and/or DL transmission to transmit the UL/DL data packets without transition to RRC-CONNECTED state. In this case, the RRC message and contention resolution ID may be multiplexed into same MAC PDU for multiple UL/DL transmission.

In this case, the DU may forward the RRC message to the UE.

For example, by using MAC CE instead of RRC message, the DU of new NG-RAN may indicate to the UE that the multiple UL/DL transmission is allowed and the configuration for multiple UL/DL transmission is allocated.

In step S1411, the DU may response with the UE CONTEXT SETUP RESPONSE message to the CU-CP.

In step S1412, for multiple UL data packets, the UE may include the UL data packet into each RRC message and sends it to the new NG-RAN.

In step S1413, the DU of new NG-RAN may forward the RRC message to the CU-CP of new NG-RAN by using UL RRC MESSAGE TRANSFER message.

In step S1414, the CU-CP of new NG-RAN may forward the RRC message to the CU-CP of last serving NG-RAN by using the XN-C RRC MESSAGE TRANSFER message.

In step S1415, the CU-CP of the last serving NG-RAN may send to the AMF the NGAP UL NAS TRANSPORT message containing the NAS-PDU. The Small Data Transmission Indication may be included to indicate to the AMF that the small data transmission in RRC-INACTIVE state is triggered by the UE.

In step S1416, the AMF may send the DL NAS TRANSPORT message containing the DL NAS PDU. When the AMF receives the Small Data Transmission Indication in step S1415, the DL NAS TRANSPORT message may include End Indication to indicate that no further data or signalling is expected with UE.

In step S1417, for multiple DL data packets, the CU-CP of last serving NG-RAN may include the DL data packet into each RRC message and send the RRC message to the new NG-RAN by using XnAP XN-C RRC MESSAGE TRANSFER message.

In step S1418, the CU-CP of new NG-RAN may forward the RRC message to the DU.

In step S1419, the DU of new NG-RAN may forward the RRC message to the UE.

Hereinafter, a method for UP small data transmission in RRC-INACTIVE state without UE context relocation between NG-RANs, according to some embodiments of the present disclosure, will be described.

According to some embodiments of the present disclosure, a new NG-RAN may send the RAI to the last serving NG-RAN, in order to establish the forwarding tunnel to deliver the UL user data and to indicate to the last serving NG-RAN the information on whether there is subsequent UL/DL data transmission for the UE or not.

For example, the last serving NG-RAN may respond with the UL UP TNL Information to deliver the UL user data. In addition, by using the user data or the control plane signalling, the last serving NG-RAN may also indicate to the AMF that the small data transmission in RRC-INACTIVE state is triggered. Based on this information, the AMF can inform the last serving NG-RAN of no further subsequent DL data from network point of view.

Figure 15:
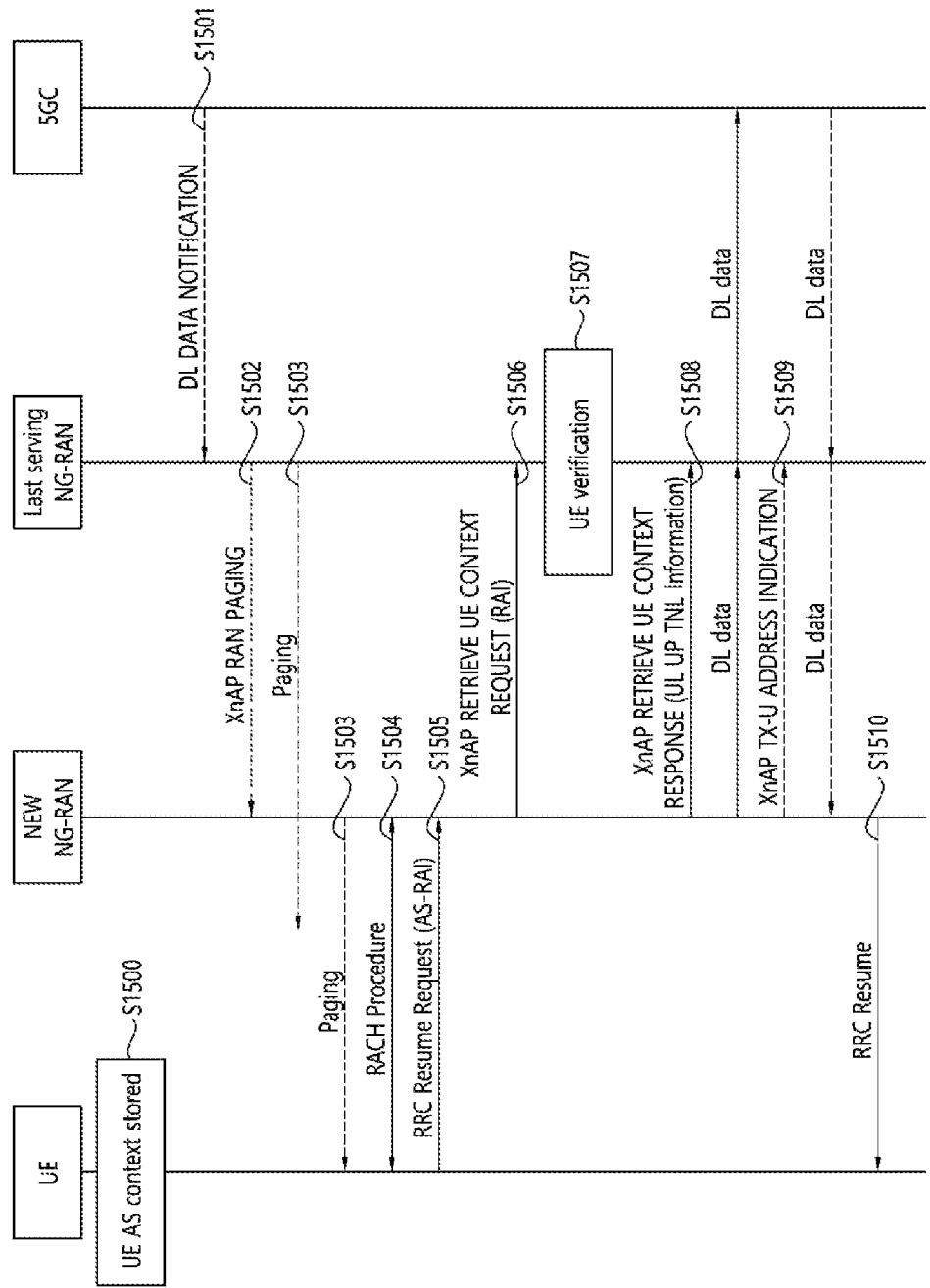
FIG. 15 shows an example of a procedure for UP small data transmission performed by a new NG-RAN and a last serving NG-RAN.

FIG. 15 shows an example of a procedure for UP small data transmission performed by a new NG-RAN and a last serving NG-RAN.

In particular, FIG. 15 may illustrate a diagram of the procedure for UP small data transmission in RRC-INACTIVE state without UE context relocation between NG-RANs.

In step S1500, the UE may be in RRC-INACTIVE state. The UE and last serving NG-RAN may store the UE context, respectively. The NG-C connection between last serving NG-RAN and AMF may be maintained. In addition, the NG-U connection between last serving NG-RAN and UPF may be maintained.

According to some embodiments of the present disclosure, before the state transition to RRC-INACTIVE, the AMF may request the last serving NG-RAN to report whenever the UE changes cell.

In step S1501, the last serving NG-RAN may receive DL data on NG-U interface.

In step S1502, the last serving NG-RAN may send the XnAP RAN PAGING message to the neighbor NG-RANs in same RAN-based notification area (RNA).

In step S1503, each NG-RAN may send Paging message to UE.

For example, steps S1501 to -S1503 are needed only in case of DL data.

In step S1504, when the UE is being paged or when new data arrives in the uplink buffer, the UE may initiate the RACH procedure.

According to some embodiments of the present disclosure, the UE may move into new NG-RAN.

In step S1505, the UE may resume the connection by sending an RRC Resume Request message to new NG-RAN. The UL user data may be transmitted on DTCH multiplexed with UL RRC Resume Request message on CCCH. The UE may include I-RNTI of the UE, the RRC resume cause, and authentication token (for example, Resume MAC-I) in the RRC Resume Request message.

The RRC Resume Request message may also include AS-Release Assistance information (for example, by using BSR, MAC CE) indicating:

No further Uplink and Downlink Data transmission, or

Only a single Downlink Data transmission subsequent to the Uplink transmission.

For CU-DU split in NG-RAN, based on the information from the UE, the DU may indicate to the CU whether there is subsequent UL/DL data transmission.

The UE may include the following additional information for SDT in the RRC Resume Request message:

Expected UL data size, and/or

Buffer status report, and/or

Traffic pattern, and/or

Preference for state transition to RRC-CONNECTED, and/or

Indication for multiple transmission for UL without transition to RRC-CONNECTED (for example, since UE has a single UL data packet which is larger than TBS of Msg3/MsgA or UE has multiple UL data packets, in which the size of each packet is smaller than TBS of Msg3/MsgA). For multiple UL transmission, this indication may include the requested number of UL grant (for PUSCH resource) occasions, requested transport block size (TBS), requested periodicity for UL grant (for PUSCH resource) occasions and time offset until the first UL grant (for PUSCH resource).

For example, the additional information for SDT may be sent to the new NG-RAN by using the MAC CE. In this case, the DU in the new NG-RAN can be aware that the UE needs multiple UL grants to transmit the UL data in RRC-INACTIVE state.

In step S1506, on receiving the message from the UE, the new NG-RAN may first check whether it is able to find the UE context or not. If not, the new NG-RAN resolves the node identity contained in the I-RNTI, and requests the last serving NG-RAN to provide UE context by initiating the XnAP Retrieve UE Context procedure. Alternatively, the XnAP UL RRC MESSAGE TRANSFER message or new message may be used instead of the RETRIEVE UE CONTEXT REQUEST message.

The new NG-RAN may include the UE location information to indicate to the AMF the current UE location in the message to the last serving NG-RAN. The additional information for SDT may be also sent to the last serving NG-RAN. In addition, the RAI may be included into this message to notify the last serving NG-RAN of the information of whether there is subsequent UL/DL data transmission. If the UE does not include the AS-RAI in step S1505, the new NG-RAN may include the information to indicate small data transmission in RRC-INACTIVE state in the message to the last serving NG-RAN.

In step S1507, the last serving NG-RAN may check whether it is able to find the UE context or not. If yes, the last serving NG-RAN may decide whether the UE context relocation to the new NG-RAN is required or not. Based on the RAI/additional information for SDT from the UE and/or the traffic pattern in subscription information from 5GC, the last serving NG-RAN may decide to keep the UE context and the UE-associated NG connection with the serving AMF and UPF for the frequent small data transmission (for example, single PDCP PDUs in uplink and/or single PDCP PDUs in downlink).

In step S1508, when the last serving NG-RAN decides to keep the UE context and the UE-associated NG connection with the serving AMF and UPF in step S1507, the last serving NG-RAN may send to the new NG-RAN the RETRIEVE UE CONTEXT RESPONSE message or new message containing the UL UP TNL Information to establish a UL data forwarding tunnel.

Based on additional information for SDT from UE, the CU-CP in the last serving NG-RAN may also include indication on whether multiple transmission for UL is needed without transition to RRC-CONNECTED state in the message to the new NG-RAN.

Also, the CU-CP of last serving NG-RAN can also indicate to the new NG-RAN whether there is DL data transmission subsequent to the UL data and whether multiple transmission for DL is needed without transition to RRC-CONNECTED state. These indications for multiple UL/DL transmission may also include the information on the configured number of UL/DL grant occasions, configured TBS, and so on.

If there is no DL data transmission subsequent to the UL data, the last serving NG-RAN may send the RETRIEVE UE CONTEXT FAILURE message instead of the RETRIEVE UE CONTEXT RESPONSE message. In this case, the last serving NG-RAN also generates the RRC Release message to indicate to the UE that the RRC connection is release.

The UL data can be forwarded via the new NG-RAN and last serving NG-RAN. The last serving NG-RAN may include a new indication into the UL PDU data in order to indicate that the small data transmission in RRC-INACTIVE is triggered and whether there is subsequent UL/DL data transmission. If the UPF is aware of small data transmission in RRC-INACTIVE state from the UL PDU data, the UPF may inform the AMF of small data transmission in RRC-INACTIVE state. The last serving NG-RAN may also send the request for allocation of a new security context (for example, Next-hop chaining count, Next-hop NH) for next RRC state transition to AMF. Based on the request for allocation of a new security context from the last serving NG-RAN, and/or the indication for SDT, and/or the subscription information, the AMF may allocate new security context and send the new security context to last serving NG-RAN by using NGAP STATE TRANSITION REQUIRED message or new message.

Alternatively, the last serving NG-RAN may send the NGAP RRC INACTIVE TRANSITION REPORT message to indicate that the small data transmission in RRC-INACTIVE is triggered and whether there is subsequent UL/DL data transmission.

For the case where the AMF requests the last serving NG-RAN to report whenever the UE changes cell, the last serving NG-RAN may send the UE location information to the AMF by using LOCATION REPORT message.

In step S1509, when the RETRIEVE UE CONTEXT RESPONSE message is received and there is only a single DL data transmission subsequent to the UL NAS PDU, the new NG-RAN may become the serving NG-RAN, and respond to the last serving NG-RAN with the XnAP XN-U ADDRESS INDICATION message including the DL UP TNL Information.

The DL data can be forwarded via the new NG-RAN and last serving NG-RAN. The AMF may include a new indication into the DL PDU data in order to indicate that there is no subsequent DL data transmission. Alternatively, the AMF may send the NGAP STATE TRANSITION REQUIRED message to indicate that there is no subsequent DL data transmission.

In step S15010, when receiving the RETRIEVE UE CONTEXT FAILURE message in step S1508, the new NG-RAN may transparently forward the RRC message to the UE. The UE may be still the RRC-INACTIVE state. If the indication, on whether multiple transmission for UL/DL is needed without transition to RRC-CONNECTED state, is received in step S1508, the new NG-RAN may send the PDCCH containing the UL grant and the UE ID (for example, I-RNTI, C-RNTI). Based on UL grants, the UE may transmit multiple UL data packets to the 5GC via the new NG-RAN and last serving NG-RAN. Based on DL grants, the UE may receive multiple DL data packets from the 5GC via the new NG-RAN and last serving NG-RAN.

When receiving the RETRIEVE UE CONTEXT RESPONSE message in step S1508, the new NG-RAN may generate the RRC Resume message for the UE. Then the UE may enter into the RRC-CONNECTED state.

Figure 16A:
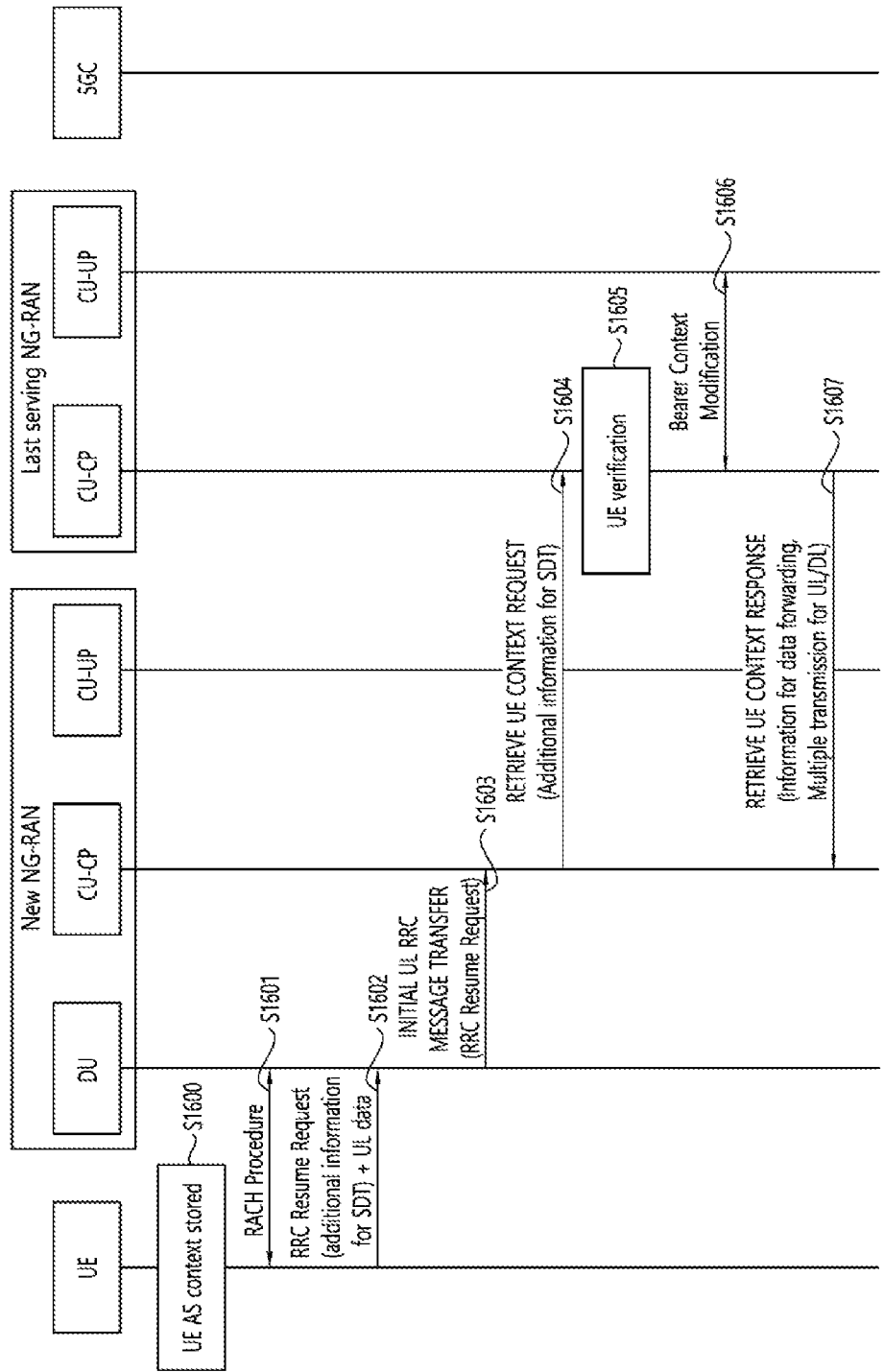
FIGS. 16A and 16B show an example of a procedure for UP small data transmission performed by a new NG-RAN and a last serving NG-RAN considering CU-DU split.
Figure 16B:
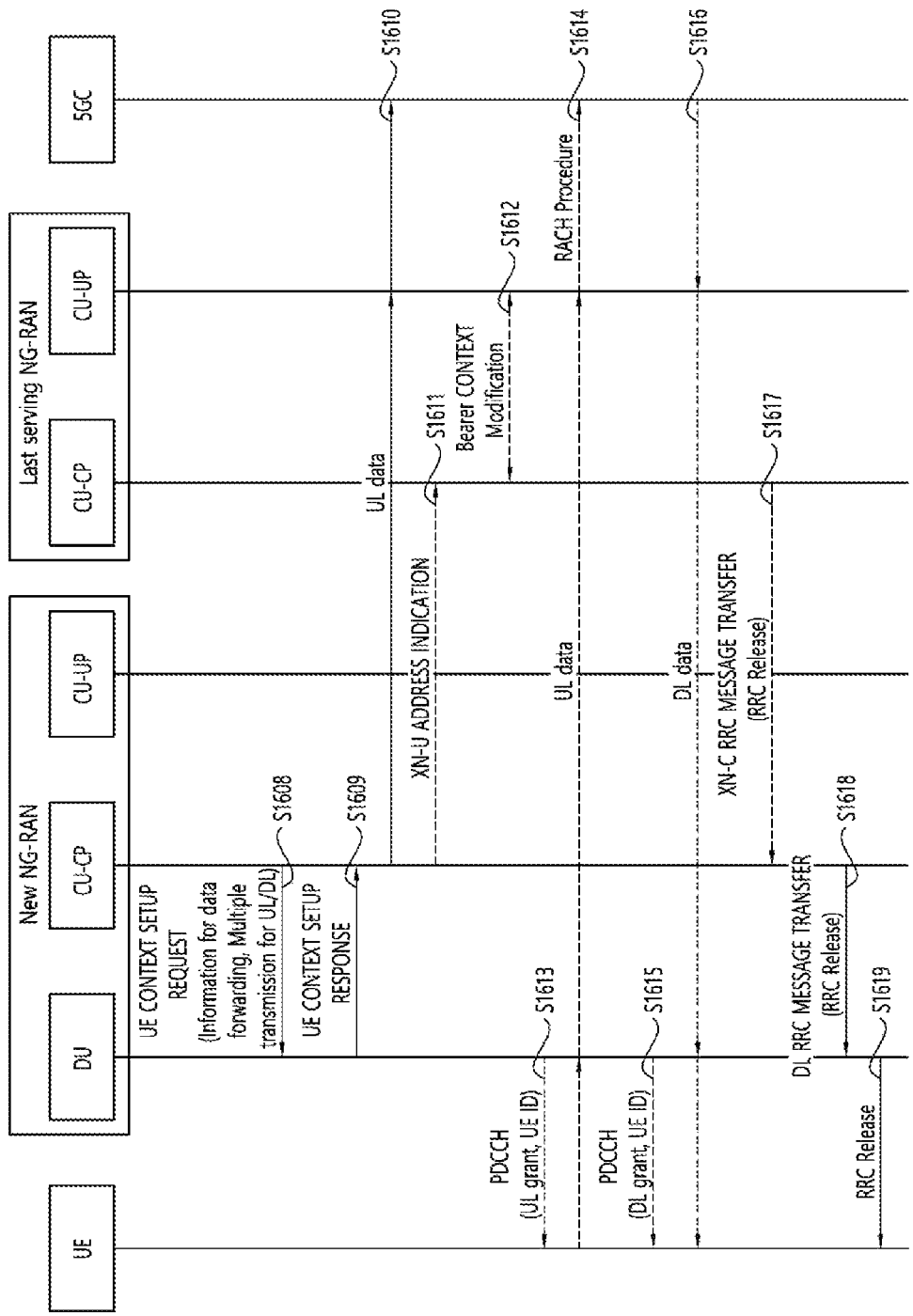

FIGS. 16A and 16B show an example of a procedure for UP small data transmission performed by a new NG-RAN and a last serving NG-RAN considering CU-DU split.

In particular, FIGS. 16A and 16B may illustrate a diagram of the procedure for UP small data transmission in RRC-INACTIVE state without UE context relocation between NG-RANs considering CU-DU split.

For example, a new NG-RAN may include a DU and a CU-CP. A last serving NG-RAN may include a CU-CP.

In step S1600, the UE may be in RRC-INACTIVE state. The UE and last serving NG-RAN may store the UE context, respectively. The NG-C connection between CU-CP of last serving NG-RAN and AMF may be maintained. In addition, the NG-U connection between CU-UP of last serving NG-RAN and UPF may be maintained.

According to some embodiments of the present disclosure, before the state transition to RRC-INACTIVE, the AMF may request the last serving NG-RAN to report whenever the UE changes cell.

In step S1601, when new data arrives in the uplink buffer, the UE may initiate the RACH procedure for small data transmission (SDT) in RRC-INACTIVE state. In this scenario, the UE may move into new NG-RAN.

In step S1602, the UE may resume the connection by sending an RRC Resume Request message to new NG-RAN. The UL user data may be transmitted on DTCH multiplexed with RRC Resume Request message on CCCH.

The UE may include I-RNTI of the UE, the RRC resume cause (for small data transmission in RRC-INACTIVE), and authentication token (for example, Resume MAC-I) in the RRC Resume Request message.

The UE may include the following additional information for SDT in the RRC Resume Request message:
  Expected UL data size, and/or
  Buffer status report, and/or
  Traffic pattern, and/or
  Preference for state transition to RRC-CONNECTED, and/or
  Indication for multiple transmission for UL without transition to RRC-CONNECTED (for example, since UE has a single UL data packet which is larger than TBS of Msg3/MsgA or UE has multiple UL data packets, in which the size of each packet is smaller than TBS of Msg3/MsgA). For multiple UL transmission, this indication may include the requested number of UL grant (for PUSCH resource) occasions, requested transport block size (TBS), requested periodicity for UL grant (for PUSCH resource) occasions and time offset until the first UL grant (for PUSCH resource).

The RRC Resume Request message may also include AS-Release Assistance information (for example, by using BSR, MAC CE or RRC message) indicating:
  No further uplink and downlink data transmission, or
  Only a single downlink data transmission subsequent to the uplink transmission.

In step S1603, the DU in the new NG-RAN may send the INITIAL UL RRC MESSAGE TRANSFER message containing the RRC Resume Request message to the CU-CP in new NG-RAN. If AS-RAI is delivered by MAC CE, the DU may also include this information into the INITIAL UL RRC MESSAGE TRANSFER message.

Since the DU does not have UL TNL information towards CU-UP, the DU in the new NG-RAN may just buffer the UL data received from the UE.

For example, in step S1602, the additional information for SDT may be sent to the new NG-RAN by using the MAC CE. In this case, the DU in the new NG-RAN can be aware that the UE needs multiple UL grants to transmit the UL data in RRC-INACTIVE state. However, since the DU has no knowledge of whether this RLC bearer (or the service or the UE) used by UL data transmission is allowed for SDT and whether the CU-CP may decide to transit to RRC-CONNECTED state, the DU may need to indicate this information to the CU-CP by using the INITIAL UL RRC MESSAGE TRANSFER message before allocating multiple UL grants to the UE.

For example, for the case where the default RLC bearer configuration is used for SDT, the CU and DU can exchange the F1-U tunnel related information in advance during F1 Setup procedure. In this case, the DU can forward the UL data to the CU-UP of new NG-RAN without the UE context.

In step S1604, on receiving the message from the UE, the CU-CP in the new NG-RAN may first check whether it is able to find the UE context or not. If not, the CU-CP in the new NG-RAN resolves the node identity contained in the I-RNTI, and requests the last serving NG-RAN to provide UE context by initiating the XnAP Retrieve UE Context procedure. Alternatively, the XnAP UL RRC MESSAGE TRANSFER message or new message may be used instead of the RETRIEVE UE CONTEXT REQUEST message.

The CU-CP of new NG-RAN may include the UE location information to indicate to the AMF the current UE location in the message to the last serving NG-RAN. The additional information for SDT may be also sent to the last serving NG-RAN. In addition, the RAI may be included into this message to notify the last serving NG-RAN of the information of whether there is UL/DL data transmission subsequent to this uplink transmission. If the RRC Resume Request message does not include the AS-RAI in step S1602, the CU-CP in the new NG-RAN may include the information to indicate small data transmission in RRC-INACTIVE state in the message to the last serving NG-RAN.

For example, for the case where (1) the default RLC bearer configuration is used for SDT and (2) F1-U/Xn-U tunnel related information is already stored in each node (by using F1 Setup and Xn Setup procedure), the UL data can be forwarded to CU-UP of last serving NG-RAN in this step.

However, it may be possible that the CU-CP of last serving NG-RAN fails to find the UE context or decides to relocate the UE context to new NG-RAN. In this case, the CU-UP of last serving NG-RAN should forward the received UL data to the new NG-RAN again. To avoid this problem, the CU-UP of new NG-RAN should store a copy of the forwarded UL data until receiving the response of the RETRIEVE UE CONTEXT REQUEST message. That is, when the RETRIEVE UE CONTEXT RESPONSE message or RETRIEVE UE CONTEXT FAILURE message is received, the CU-CP of new NG-RAN may send the request to release the copy of the UL data to the CU-UP of new NG-RAN.

In step S1605, the CU-CP in the last serving NG-RAN may check whether it is able to find the UE context or not. If yes, the CU-CP in the last serving NG-RAN may decide whether the UE context relocation to the new NG-RAN is required or not. Based on the RAI/additional information for SDT from the UE and/or the traffic pattern in subscription information from 5GC, the CU-CP in the last serving NG-RAN may decide to keep the UE context and the UE-associated NG connection with the serving AMF and UPF for the frequent small data transmission (for example, single PDCP PDUs in uplink and/or single PDCP PDUs in downlink).

In step S1606, when the CU-CP in the last serving NG-RAN decides to keep the UE context and the UE-associated NG connection with the serving AMF and UPF in step S1605, the CU-CP in the last serving NG-RAN may trigger the Bearer Context Modification procedure in order to resume the Bearer Context for the UE and allocate the UL UP TNL information for the establishment of the UL data forwarding tunnel.

In step S1607, when the last serving NG-RAN decides to keep the UE context and the UE-associated NG connection with the serving AMF and UPF in step S1605, the CU-CP in the last serving NG-RAN may send to the new NG-RAN the RETRIEVE UE CONTEXT RESPONSE message or RETRIEVE UE CONTEXT FAILURE message or new message containing the information to establish a data forwarding tunnel. This information may include the CellGroupConfig, RLC bearer configuration stored in the UE context and the UL UP TNL information allocated by CU-UP of the last serving NG-RAN in step S1606. Based on additional information for SDT from UE, the CU-CP in the last serving NG-RAN may also include indication on whether multiple transmission for UL is needed without transition to RRC-CONNECTED state in the message to the new NG-RAN. Also, the CU-CP of last serving NG-RAN can also indicate to the new NG-RAN whether there is DL data transmission subsequent to the UL data and whether multiple transmission for DL is needed without transition to RRC-CONNECTED state. These indications for multiple UL/DL transmission may also include the information on the configured number of UL/DL grant occasions, configured TBS, and so on.

The CU-CP of last serving NG-RAN may also send the request for allocation of a new security context (for example, Next-hop chaining count, Next-hop NH) for next RRC state transition to the AMF. Based on the request for allocation of a new security context from the last serving NG-RAN, and/or the indication for SDT, and/or the subscription information, the AMF may allocate new security context and send new security context to last serving NG-RAN by using NGAP STATE TRANSITION REQUIRED message or new message.

In this step, the CU-CP of last serving NG-RAN may generate the RRC message and send it to new NG-RAN. Also, the CU-CP of last serving NG-RAN may indicate when new NG-RAN should deliver the RRC message (e.g., RRC Resume, RRC Release) to the UE. For example, when the number of multiple UL/DL transmission which is configured by the CU-CP of last serving NG-RAN is completed, the CU-CP of the new NG-RAN may forward the RRC message to the UE via the DU.

According to some embodiments of the present disclosure, for the case where the AMF requests the last serving NG-RAN to report whenever the UE changes cell, the last serving NG-RAN may send the UE location information to the AMF by using LOCATION REPORT message.

In step S1608, when the information to establish a data forwarding tunnel is received, the CU-CP in new NG-RAN may initiate the UE Context Setup procedure towards the DU in order to establish a data forwarding tunnel between the DU of new NG-RAN and CU-UP of last serving NG-RAN. The UE CONTEXT SETUP REQUEST message may include the information received in step S1607.

For example, if the user data is sent from/to CU-UP of the last serving NG-RAN via the DU and CU-UP of new NG-RAN, the CU-CP of new NG-RAN may initiate the Bearer Context Setup procedure towards the CU-UP of new NG-RAN before step S1608 in order to establish a F1-U tunnel between the DU and CU-UP of new NG-RAN as well as Xn-U tunnel between CU-UP of new NG-RAN and CU-UP of last serving NG-RAN. Therefore, the UL UP TNL information received in step S1607 may be sent to the CU-UP of new NG-RAN. Also, the CU-CP of new NG-RAN may initiate the Bearer Context Modification procedure towards the CU-UP of new NG-RAN in step S1609 in order to update the F1-U tunnel between the DU and CU-UP of new NG-RAN.

In step S1609, on reception of the message in step S1608, the DU of new NG-RAN may be now aware that the UE needs multiple UL grants and/or DL grants to transmit the UL/DL data without transition to RRC-CONNECTED state.

Then, the DU may respond with the UE CONTEXT SETUP RESPONSE message containing the DL UP TNL information to the CU-CP.

In step S1610, the DU may forward the buffered UL data towards 5GC via the CU-UP of last serving NG-RAN.

The CU-UP of last serving NG-RAN may include a new indication into the UL PDU data in order to indicate that the small data transmission in RRC-INACTIVE is triggered and whether there is subsequent UL/DL data transmission. If the UPF is aware of small data transmission in RRC-INACTIVE state from the UL PDU data, the UPF should inform the AMF of small data transmission in RRC-INACTIVE state.

Alternatively, the CU-CP of last serving NG-RAN may send the NGAP RRC INACTIVE TRANSITION REPORT message to indicate that the small data transmission in RRC-INACTIVE is triggered and whether there is subsequent UL/DL data transmission.

For example, if there is no DL data transmission subsequent to the UL data, the CU-CP in last serving NG-RAN may generate the RRC Release message to indicate to the UE that the RRC connection is released, and send it to new NG-RAN. The new NG-RAN may just forward the RRC message to UE.

In step S1611, if there is only a single DL data transmission subsequent to the UL data, the CU-CP of new NG-RAN may respond to the last serving NG-RAN with the XnAP XN-U ADDRESS INDICATION message including the DL UP TNL Information.

For example, if the user data is sent from/to CU-UP of the last serving NG-RAN via the DU and CU-UP of new NG-RAN, the DL UP TNL information may be allocated by the CU-UP of new NG-RAN instead of the DU of new NG-RAN.

In step S1612, on reception of the XN-U ADDRESS INDICATION message, the CU-CP in last serving NG-RAN may initiate the Bearer Context Modification procedure to update the DL UP TNL information at the CU-UP.

In step S1613, if the indication on whether multiple transmission for UL is needed without transition to RRC-CONNECTED state is received in step S1608, the DU may send the PDCCH containing the UL grant and the UE ID (for example, I-RNTI, C-RNTI).

For example, the DU of new NG-RAN may allocate multiple UL/DL grants to UE in this step.

In step S1614, based on UL grants, the UE may transmit multiple UL data packets to the 5GC via the new NG-RAN and last serving NG-RAN.

In step S1615, if the indication, on whether multiple transmission for DL is needed without transition to RRC-CONNECTED state, is received in step S1608, the DU may send the PDCCH containing the DL grant and the UE ID (for example, I-RNTI, C-RNTI).

The first or last DL data packet can be transmitted on DTCH multiplexed with RRC message on DCCH.

In step S1616, the DL data can be forwarded via the new NG-RAN and last serving NG-RAN. Based on DL grants, the UE may receive multiple DL data packets from the 5GC via the new NG-RAN and last serving NG-RAN.

For example, the AMF may include a new indication into the DL PDU data in order to indicate that there is no subsequent DL data transmission. Alternatively, the AMF may send the NGAP STATE TRANSITION REQUIRED message or new message to indicate that there is no subsequent DL data transmission. Therefore, the CU-CP of last serving NG-RAN can check whether there is remaining DL data to be delivered.

In step S1617, when there is no remaining UL/DL data transmission, the CU-CP of last serving NG-RAN may generate the RRC Release message to indicate to the UE that the RRC connection is released, and send the RRC Release message to new NG-RAN.

According to some embodiments of the present disclosure, if multiple UL/DL data transmission is not completed, the CU-CP of last serving NG-RAN may generate the RRC Release message, and send the RRC Release message to new NG-RAN in step S1607. In this scenario, the new NG-RAN may forward the RRC Release message to UE in step S1608, and then continues the multiple UL/DL transmission. Alternatively, the new NG-RAN may hold on the delivery of the RRC Release message, and then forward it to the UE as soon as the completion of the multiple UL/DL transmission.

In step S1618, the CU-CP of new NG-RAN may forward the RRC message to the DU.

When receiving the RETRIEVE UE CONTEXT RESPONSE message in step S1608, the new NG-RAN may generate the RRC Resume message for the UE. The UE may enter into the RRC-CONNECTED state.

In step S1619, the DU may forward the RRC message to the UE. The UE may be still in the RRC-INACTIVE state.

Hereinafter, a method for exchange of SDT support indication in RRC-INACTIVE, according to some embodiments of the present disclosure, will be described.

According to some embodiments of the present disclosure, the gNB-DU may exchange the SDT support indication in RRC-INACTIVE with the gNB-CU, by using the F1 Setup procedure (or F1 Configuration Update procedure).

For example, the NG-RAN1 may exchanges the SDT support indication in RRC-INACTIVE with the NG-RAN2 by using the Xn Setup procedure (or NG-RAN node Configuration Update).

Based on this information, the last serving NG-RAN can configure the UE with the RAN-based Notification Area (RNA), where the RNA contains a single or multiple cells, or list of RAN areas supporting the SDT.

Figure 17:
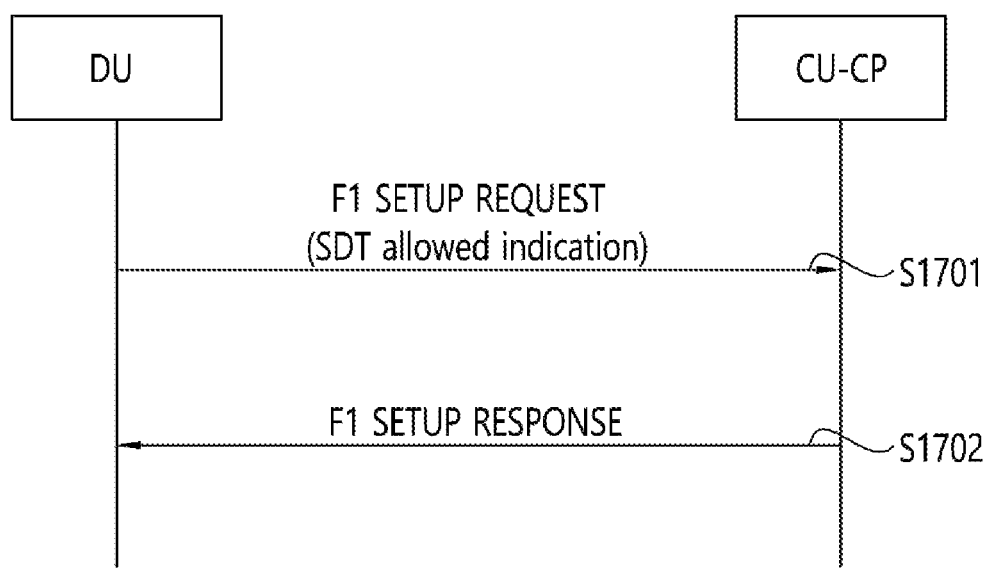
FIG. 17 shows an example of a procedure for exchange of SDT support indication in RRC-INACTIVE between DU and CU over F1 interface.

FIG. 17 shows an example of a procedure for exchange of SDT support indication in RRC-INACTIVE between DU and CU over F1 interface.

In particular, FIG. 17 may illustrate a diagram of the procedure for exchange of SDT support indication in RRC-INACTIVE between DU and CU over F1 interface.

In step S1701, by using the F1 SETUP REQUEST message, the gNB-DU may send the SDT allowed indication to indicate that the SDT in RRC-INACTIVE is allowed in the DU.

For example, this indication can be sent to the gNB-CU by using the gNB-DU Configuration Update procedure or gNB-CU Configuration Update procedure.

In step S1702, the gNB-CU may respond with the F1 SETUP RESPONSE message to the gNB-DU.

Figure 18:
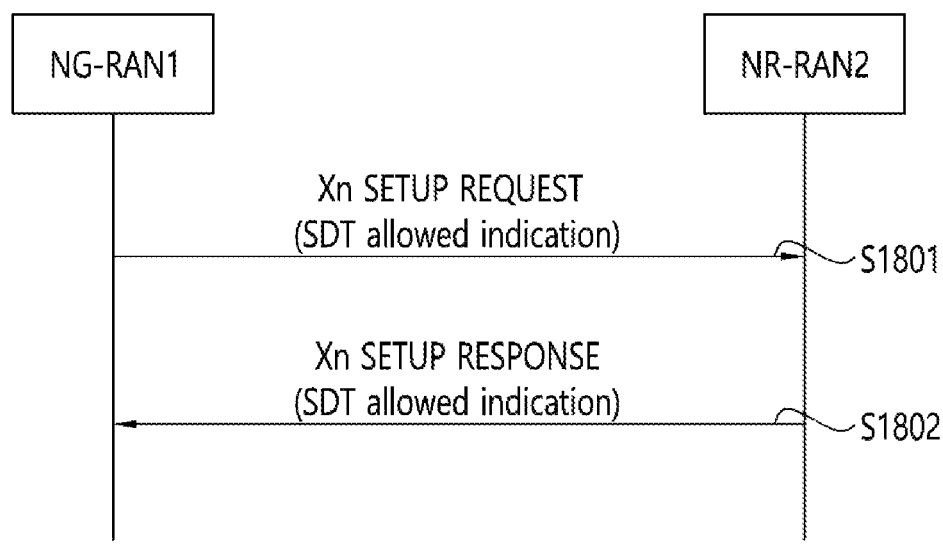
FIG. 18 shows an example of a procedure for exchange of SDT support indication in RRC-INACTIVE between NG-RAN1 and NG-RAN2 over Xn interface.

FIG. 18 shows an example of a procedure for exchange of SDT support indication in RRC-INACTIVE between NG-RAN1 and NG-RAN2 over Xn interface.

In step S1801, by using the Xn SETUP REQUEST message, the NG-RAN1 may send the SDT allowed indication to indicate that the SDT in RRC-INACTIVE is allowed in the NG-RAN1.

For example, this indication can be sent to the NG-RAN2 by using the NG-RAN node Configuration Update procedure.

In step S1802, the NG-RAN2 may respond with the Xn SETUP RESPONSE message containing the SDT allowed indication to the NG-RAN1.

Hereinafter, an apparatus fast small data transmission in a wireless communication system, according to some embodiments of the present disclosure, will be described.

According to some embodiments of the present disclosure, a last serving Radio Access Network (RAN) node may include a processor, a transceiver, and a memory.

For example, the processor may be configured to be coupled operably with the memory and the processor.

The processor may be configured to suspend a Radio Resource Control (RRC) connection with a wireless device. The processor may be configured to receive, from the wireless device and via a new RAN node, an Access Stratum (AS)-Release Assistance Information (RAI) related to early data transmission. For example, the AS-RAI may inform whether there is Uplink (UL) data transmission and/or Downlink (DL) data transmission for the wireless device subsequent to the early data transmission, or not. The processor may be configured to decide whether a UE context relocation to the new RAN node for the wireless device is required or not based on the received AS-RAI. The processor may be configured to transmit, to the new RAN node, an RRC message based on the decision.

For example, the AS-RAI may further inform (1) no further UL data transmission and/or DL data transmission, or (2) only a single DL data transmission subsequent to the early data transmission.

For example, the RRC message may include a tunnel information to establish a data forwarding tunnel, from the new RAN node to a core network node via the last serving RAN node, for the wireless device.

According to some embodiments of the present disclosure, the AS-RAI may be included in a Medium Access Control (MAC)-Control Element (CE), which is transmitted to the new RAN node from the wireless device.

According to some embodiments of the present disclosure, the AS-RAI may be included in an RRC resume request message, which is transmitted to the new RAN node from the wireless device.

According to some embodiments of the present disclosure, the processor may be configured to receive, from a core network node, a subscription information including a traffic pattern. For example, the decision, whether the UR context relocation to the new RAN node for the wireless device is required or not, may be further based on the traffic pattern included in the subscription information.

According to some embodiments of the present disclosure, the processor may be configured to decide whether to keep a connection with a core network node for the wireless device or not based on the AS-RAI.

According to some embodiments of the present disclosure, the processor may be configured to receive, from the new RAN node, a UE context request message for the wireless device. For example, wherein the AS-RAI is included in the UE context request message.

According to some embodiments of the present disclosure, the processor may be configured to receive, from a core network node, an END indication to inform that no further data or signalling is expected with the wireless device. The processor may be configured to transmit, to the new RAN node, a UE context failure message for the wireless device.

For example, the RRC message may be included in the UE context failure message and inform the wireless device to be in an RRC inactive state.

According to some embodiments of the present disclosure, the processor may be configured to receive, from a core network node, a state transition required message to resume the RRC connection for the wireless device. The processor may be configured to transmit, to the new NG-RAN, a UE context response message for the wireless device.

For example, the RRC message may be included in the UE context response message and inform the wireless device to enter an RRC connected state.

According to some embodiments of the present disclosure, the processor may be configured to transmit, to a core network node, a Small Data Transmission indication for the early data transmission based on the AS-RAI.

For example, the Small Data Transmission indication may inform that (1) the early data transmission is triggered by the wireless device and (2) the early data transmission is performed via the new RAN node and last serving RAN node without UE context relocation.

For example, the Small Data Transmission indication may inform that whether there is UL data transmission and/or DL data transmission for the wireless device.

For example, referring to FIG. 1, base stations (BSs) 200 could be an example of a last serving RAN node and a new RAN node for fast small data transmission.

Hereinafter, a processor for a last serving Radio Access Network (RAN) node for fast small data transmission in a wireless communication system, according to some embodiments of the present disclosure, will be described.

The processor may be configured to control the last serving RAN node to suspend a Radio Resource Control (RRC) connection with a wireless device. The processor may be configured to control the last serving RAN node to receive, from the wireless device and via a new RAN node, an Access Stratum (AS)-Release Assistance Information (RAI) related to early data transmission. For example, the AS-RAI may inform whether there is Uplink (UL) data transmission and/or Downlink (DL) data transmission for the wireless device subsequent to the early data transmission, or not. The processor may be configured to control the last serving RAN node to decide whether a UE context relocation to the new RAN node for the wireless device is required or not based on the received AS-RAI. The processor may be configured to control the last serving RAN node to transmit, to the new RAN node, an RRC message based on the decision.

For example, the AS-RAI may further inform (1) no further UL data transmission and/or DL data transmission, or (2) only a single DL data transmission subsequent to the early data transmission.

For example, the RRC message may include a tunnel information to establish a data forwarding tunnel, from the new RAN node to a core network node via the last serving RAN node, for the wireless device.

According to some embodiments of the present disclosure, the AS-RAI may be included in a Medium Access Control (MAC)-Control Element (CE), which is transmitted to the new RAN node from the wireless device.

According to some embodiments of the present disclosure, the AS-RAI may be included in an RRC resume request message, which is transmitted to the new RAN node from the wireless device.

According to some embodiments of the present disclosure, the processor may be configured to control the last serving RAN node to receive, from a core network node, a subscription information including a traffic pattern. For example, the decision, whether the UR context relocation to the new RAN node for the wireless device is required or not, may be further based on the traffic pattern included in the subscription information.

According to some embodiments of the present disclosure, the processor may be configured to control the last serving RAN node to decide whether to keep a connection with a core network node for the wireless device or not based on the AS-RAI.

According to some embodiments of the present disclosure, the processor may be configured to control the last serving RAN node to receive, from the new RAN node, a UE context request message for the wireless device. For example, wherein the AS-RAI is included in the UE context request message.

According to some embodiments of the present disclosure, the processor may be configured to control the last serving RAN node to receive, from a core network node, an END indication to inform that no further data or signalling is expected with the wireless device. The processor may be configured to control the last serving RAN node to transmit, to the new RAN node, a UE context failure message for the wireless device.

For example, the RRC message may be included in the UE context failure message and inform the wireless device to be in an RRC inactive state.

According to some embodiments of the present disclosure, the processor may be configured to control the last serving RAN node to receive, from a core network node, a state transition required message to resume the RRC connection for the wireless device. The processor may be configured to control the last serving RAN node to transmit, to the new NG-RAN, a UE context response message for the wireless device.

For example, the RRC message may be included in the UE context response message and inform the wireless device to enter an RRC connected state.

According to some embodiments of the present disclosure, the processor may be configured to control the last serving RAN node to transmit, to a core network node, a Small Data Transmission indication for the early data transmission based on the AS-RAI.

For example, the Small Data Transmission indication may inform that (1) the early data transmission is triggered by the wireless device and (2) the early data transmission is performed via the new RAN node and last serving RAN node without UE context relocation.

For example, the Small Data Transmission indication may inform that whether there is UL data transmission and/or DL data transmission for the wireless device.

Hereinafter, a non-transitory computer-readable medium has stored thereon a plurality of instructions for fast small data transmission in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a last serving Radio Access Network (RAN) node.

The stored a plurality of instructions may cause the last serving RAN node to suspend a Radio Resource Control (RRC) connection with a wireless device. The stored a plurality of instructions may cause the last serving RAN node to receive, from the wireless device and via a new RAN node, an Access Stratum (AS)-Release Assistance Information (RAI) related to early data transmission. For example, the AS-RAI may inform whether there is Uplink (UL) data transmission and/or Downlink (DL) data transmission for the wireless device subsequent to the early data transmission, or not. The stored a plurality of instructions may cause the last serving RAN node to decide whether a UE context relocation to the new RAN node for the wireless device is required or not based on the received AS-RAI. The stored a plurality of instructions may cause the last serving RAN node to transmit, to the new RAN node, an RRC message based on the decision.

For example, the AS-RAI may further inform (1) no further UL data transmission and/or DL data transmission, or (2) only a single DL data transmission subsequent to the early data transmission.

For example, the RRC message may include a tunnel information to establish a data forwarding tunnel, from the new RAN node to a core network node via the last serving RAN node, for the wireless device.

According to some embodiments of the present disclosure, the AS-RAI may be included in a Medium Access Control (MAC)-Control Element (CE), which is transmitted to the new RAN node from the wireless device.

According to some embodiments of the present disclosure, the AS-RAI may be included in an RRC resume request message, which is transmitted to the new RAN node from the wireless device.

According to some embodiments of the present disclosure, the stored a plurality of instructions may cause the last serving RAN node to receive, from a core network node, a subscription information including a traffic pattern. For example, the decision, whether the UR context relocation to the new RAN node for the wireless device is required or not, may be further based on the traffic pattern included in the subscription information.

According to some embodiments of the present disclosure, the stored a plurality of instructions may cause the last serving RAN node to decide whether to keep a connection with a core network node for the wireless device or not based on the AS-RAI.

According to some embodiments of the present disclosure, the stored a plurality of instructions may cause the last serving RAN node to receive, from the new RAN node, a UE context request message for the wireless device. For example, wherein the AS-RAI is included in the UE context request message.

According to some embodiments of the present disclosure, the stored a plurality of instructions may cause the last serving RAN node to receive, from a core network node, an END indication to inform that no further data or signalling is expected with the wireless device. The stored a plurality of instructions may cause the last serving RAN node to transmit, to the new RAN node, a UE context failure message for the wireless device.

For example, the RRC message may be included in the UE context failure message and inform the wireless device to be in an RRC inactive state.

According to some embodiments of the present disclosure, the stored a plurality of instructions may cause the last serving RAN node to receive, from a core network node, a state transition required message to resume the RRC connection for the wireless device. The stored a plurality of instructions may cause the last serving RAN node to transmit, to the new NG-RAN, a UE context response message for the wireless device.

For example, the RRC message may be included in the UE context response message and inform the wireless device to enter an RRC connected state.

According to some embodiments of the present disclosure, the stored a plurality of instructions may cause the last serving RAN node to transmit, to a core network node, a Small Data Transmission indication for the early data transmission based on the AS-RAI.

For example, the Small Data Transmission indication may inform that (1) the early data transmission is triggered by the wireless device and (2) the early data transmission is performed via the new RAN node and last serving RAN node without UE context relocation.

For example, the Small Data Transmission indication may inform that whether there is UL data transmission and/or DL data transmission for the wireless device.

The present disclosure may have various advantageous effects.

According to some embodiments of the present disclosure, a Radio Access Network (RAN) node could efficiently perform fast small data transmission in a wireless communication system.

According to some embodiments of the present disclosure, the last serving NG-RAN could efficiently decide whether the UE context should be relocated or not for small data transmission in RRC-INACTIVE state.

For example, the AMF could know the exact UE location. For example, based on the End Indication and/or an information from the AMF, the last serving NG-RAN could push the UE back into the RRC-INACTIVE state as soon as possible.

For example, the UE could save resource and power by performing the small data transmission.

For example, in Central Unit (CU)-Distributed Unit (DU) split, based on the indication from the last serving NG-RAN, the DU of new NG-RAN can be aware of whether the multiple Uplink (UL) and/or Downlink (DL) transmission is allowed and how the configuration for multiple UL and/or DL transmission is allocated.

According to some embodiments of the present disclosure, a last serving NG-RAN can configure the UE with the RAN-based Notification Area (RNA), where the RNA contains a single or multiple cells, or list of RAN areas supporting the SDT.

According to some embodiments of the present disclosure, a wireless communication system could provide an efficient solution for fast small data transmission in a wireless communication system.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a last serving Radio Access Network (RAN) node in a wireless communication system, the method comprising,
    suspending a Radio Resource Control (RRC) connection with a wireless device;
    receiving, from the wireless device and via a new RAN node, an Access Stratum (AS)-Release Assistance Information (RAI) related to early data transmission, wherein the AS-RAI informs whether there is Uplink (UL) data transmission and/or Downlink (DL) data transmission for the wireless device subsequent to the early data transmission, or not;
    deciding whether a UE context relocation to the new RAN node for the wireless device is required or not based on the received AS-RAI; and
    transmitting, to the new RAN node, an RRC message based on the decision.

2. The method of claim 1, wherein the AS-RAI further informs (1) no further UL data transmission and/or DL data transmission, or (2) only a single DL data transmission for the wireless device subsequent to the early data transmission.

3. The method of claim 1, wherein the RRC message includes a tunnel information to establish a data forwarding tunnel, from the new RAN node to a core network node via the last serving RAN node, for the wireless device.

4. The method of claim 1, wherein the AS-RAI is included in a Medium Access Control (MAC)-Control Element (CE), which is transmitted to the new RAN node from the wireless device.

5. The method of claim 1, wherein the AS-RAI is included in an RRC resume request message, which is transmitted to the new RAN node from the wireless device.

6. The method of claim 1, wherein the method further comprises,
    receiving, from a core network node, a subscription information including a traffic pattern,
    wherein the decision, whether the UR context relocation to the new RAN node for the wireless device is required or not, is further based on the traffic pattern included in the subscription information.

7. The method of claim 1, wherein the method further comprises,
    deciding whether to keep a connection with a core network node for the wireless device or not based on the AS-RAI.

8. The method of claim 1, wherein the method further comprises,
    receiving, from the new RAN node, a UE context request message for the wireless device,
    wherein the AS-RAI is included in the UE context request message.

9. The method of claim 1, wherein the method further comprises,
    receiving, from a core network node, an END indication to inform that no further data or signalling is expected with the wireless device; and
    transmitting, to the new RAN node, a UE context failure message for the wireless device.

10. The method of claim 9, wherein the RRC message is included in the UE context failure message and informs the wireless device to be in an RRC inactive state.

11. The method of claim 1, wherein the method further comprises,
    receiving, from a core network node, a state transition required message to resume the RRC connection for the wireless device; and
    transmitting, to the new NG-RAN, a UE context response message for the wireless device.

12. The method of claim 11, wherein the RRC message is included in the UE context response message and informs the wireless device to enter an RRC connected state.

13. The method of claim 1, wherein the method further comprises,
    transmitting, to a core network node, a Small Data Transmission indication for the early data transmission based on the AS-RAI.

14. The method of claim 13, wherein the Small Data Transmission indication informs that (1) the early data transmission is triggered by the wireless device and (2) the early data transmission is performed via the new RAN node and last serving RAN node without UE context relocation.

15. The method of claim 13, wherein the Small Data Transmission indication informs that whether there is UL data transmission and/or DL data transmission for the wireless device.

16. A last serving Radio Access Network (RAN) node in a wireless communication system comprising:
    a memory;
    a transceiver; and
    at least one processor operatively coupled to the memory and the transceiver, and configured to:
    suspend a Radio Resource Control (RRC) connection with a wireless device;
    receive, from the wireless device and via a new RAN node, an Access Stratum (AS)-Release Assistance Information (RAI) related to early data transmission, wherein the AS-RAI informs whether there is Uplink (UL) data transmission and/or Downlink (DL) data transmission for the wireless device subsequent to the early data transmission, or not;
    decide whether a UE context relocation to the new RAN node for the wireless device is required or not based on the received AS-RAI; and
    transmit, to the new RAN node, an RRC message based on the decision.

17. The last serving RAN node of claim 16, wherein the AS-RAI further informs (1) no further UL data transmission and/or DL data transmission, or (2) only a single DL data transmission for the wireless device subsequent to the early data transmission.

18. The last serving RAN node of claim 16, wherein the RRC message includes a tunnel information to establish a data forwarding tunnel, from the new RAN node to a core network node via the last serving RAN node, for the wireless device.

19. The last serving RAN node of claim 16, wherein the AS-RAI is included in a Medium Access Control (MAC)-Control Element (CE), which is transmitted to the new RAN node from the wireless device.

20. A non-transitory computer-readable medium having stored thereon a plurality of instructions, which, when executed by a processor of a last serving Radio Access Network (RAN) node in a wireless communication system, cause the last serving RAN node to:
- suspend a Radio Resource Control (RRC) connection with a wireless device;
- receive, from the wireless device and via a new RAN node, an Access Stratum (AS)-Release Assistance Information (RAI) related to early data transmission, wherein the AS-RAI informs whether there is Uplink (UL) data transmission and/or Downlink (DL) data transmission for the wireless device subsequent to the early data transmission, or not;
- decide whether a UE context relocation to the new RAN node for the wireless device is required or not based on the received AS-RAI; and
- transmit, to the new RAN node, an RRC message based on the decision.

\* \* \* \* \*